United States Patent
Hinoue et al.

(10) Patent No.: US 7,532,436 B2
(45) Date of Patent: May 12, 2009

(54) MAGNETIC RECORDING MEDIUM AND MAGNETIC MEMORY DEVICE FOR HIGH DENSITY RECORDING

(75) Inventors: Tatsuya Hinoue, Kanagawa (JP); Hidekazu Kashiwase, Kanagawa (JP); Hiroyuki Suzuki, Kanagawa (JP); Tomoo Yamamoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 591 days.

(21) Appl. No.: 11/223,603

(22) Filed: Sep. 9, 2005

(65) Prior Publication Data

US 2006/0057429 A1 Mar. 16, 2006

(30) Foreign Application Priority Data

Sep. 14, 2004 (JP) ............................. 2004-266425

(51) Int. Cl.
*G11B 5/66* (2006.01)
(52) U.S. Cl. .................... 360/131; 428/828.1; 428/829; 428/831
(58) Field of Classification Search .................. 428/829
See application file for complete search history.

(56) References Cited

U.S. PATENT DOCUMENTS

| | | | | |
|---|---|---|---|---|
| 5,759,681 | A * | 6/1998 | Hosoe et al. ................. | 428/332 |
| 6,168,861 | B1 * | 1/2001 | Chen et al. .................. | 428/336 |
| 6,759,138 | B2 * | 7/2004 | Tomiyasu et al. ......... | 428/828.1 |
| 6,828,036 | B1 * | 12/2004 | Munteanu et al. ......... | 428/828.1 |
| 7,070,870 | B2 * | 7/2006 | Bertero et al. ............... | 428/828 |
| 7,241,517 | B2 * | 7/2007 | Acharya et al. ............. | 428/829 |
| 2003/0104248 | A1 * | 6/2003 | Tomiyasu et al. ........... | 428/693 |
| 2004/0166371 | A1 * | 8/2004 | Berger et al. ............. | 428/694 T |
| 2005/0053805 | A1 * | 3/2005 | Hinoue et al. ......... | 428/694 TM |
| 2006/0046102 | A1 * | 3/2006 | Bian et al. ............... | 428/828.1 |
| 2006/0051620 | A1 * | 3/2006 | Hinoue et al. ............ | 428/828.1 |
| 2006/0057428 | A1 * | 3/2006 | Akagi et al. ............. | 428/828.1 |

(Continued)

FOREIGN PATENT DOCUMENTS

| JP | 05-205239 A | 8/1993 |
|---|---|---|
| JP | 07-134820 A | 5/1995 |
| JP | 11-283230 | 10/1999 |
| JP | 2001-056924 A | 2/2001 |
| JP | 2003-085729 A | 3/2003 |

OTHER PUBLICATIONS

Derwent Abstract Translation of WO 2004/090874 A1 (Derwent Acc. No. 2004-758135).*

*Primary Examiner*—Kevin M Bernatz
(74) *Attorney, Agent, or Firm*—Townsend and Townsend and Crew LLP; Darren Gold

(57) ABSTRACT

A longitudinal magnetic recording medium having a high medium S/N, with no problems in view of the overwrite characteristic, excellent in the bit error rate and sufficiently stable also to thermal fluctuations is provided. In one embodiment, a first underlayer, second underlayer, and a third underlayer are formed on a substrate and, further, a first magnetic layer, a spacer layer including Ru as a main ingredient, a second magnetic layer, and a third magnetic layer are formed in adjacent with each other in this order. The thickness of the second magnetic layer is made larger than the thickness of the third magnetic layer and the total for the concentrations of cobalt and platinum obtained in the second magnetic layer is not more than the total for the concentrations of cobalt and platinum contained in the third magnetic layer.

16 Claims, 3 Drawing Sheets

U.S. PATENT DOCUMENTS

| | | | |
|---|---|---|---|
| 2006/0199042 A1* | 9/2006 | Fullerton et al. | 428/828.1 |
| 2006/0204791 A1* | 9/2006 | Sakawaki et al. | 428/828.1 |
| 2007/0019328 A1* | 1/2007 | Mirzamaani et al. | 360/135 |
| 2007/0037015 A1* | 2/2007 | Mirzamaani et al. | 428/828 |

* cited by examiner

MAGNETIC RECORDING MEDIUM AND MAGNETIC MEMORY DEVICE FOR HIGH DENSITY RECORDING

This application claims priority from Japanese Patent Application No. JP 2004-266425, filed Sep. 14, 2004, the entire disclosure of which is incorporated herein by reference.

BACKGROUND OF THE INVENTION

The present invention concerns a magnetic recording medium for realizing a high density magnetic recording, and a magnetic memory device of a large capacity using the same.

Demand for larger capacity has increased more and more for magnetic disk apparatus. For coping with the demand, development has been required for a magnetic head at high sensitivity and a recording medium of high S/N. For improving S/N of the medium, it is necessary to improve the read output when recorded at high density. Generally, a recording medium includes a first underlayer referred to as a seed layer (formed on a substrate), a second underlayer of a body-centered cubic structure including chromium as a main ingredient, a magnetic layer, and a protective film including carbon as a main ingredient. For the magnetic layer, an alloy having a hexagonal close packed structure mainly including cobalt as a main ingredient is used. For improving the read output, it is effective to crystallographically orient the (11·0) face or (10·0) face substantially in parallel with the plane of the substrate in the magnetic layer and direct the c-axis of the hexagonal close packed structure as the easy axis of magnetization to the in-plane direction. It has been known that the crystallographic orientation of the magnetic layer can be controlled by a seed layer. Further, it has been known that the read output can be improved by applying mechanical texturing to the substrate thereby introducing magnetic anisotropy in the circumferential direction (see Patent document 1, Japanese Patent Laid-Open No. 5-205239).

In addition to the improvement for the read output, decrease of medium noises is also an important subject in view of the improvement of the medium S/N. For decreasing the medium noises, it is effective to adopt a multi-layered structure for the magnetic layer, refine the grain size and decrease Brt as a product of a residual magnetic flux density (Br) and the film thickness (t) of the magnetic layer. That is, it has been provided a magnetic recording medium of forming an underlayer on a substrate, and disposing thereon stacked magnetic films constituted with at least two magnetic layers of different compositions in contact with each other by way of a non-magnetic layer such as made of ruthenium in a multi-layered constitution (see Patent document 2, Japanese Patent Laid-Open No. 7-134820). By the use of the magnetic recording medium described above, a magnetic recording medium of a multi-layered structure intended for decreasing the noises while maintaining magnetic characteristics having a thermal stability is attained.

Since excess refinement of the grain size and decrease of Brt result in the degradation of the thermal stability, decrease of noises is limited and higher coercivity of the medium has been considered together. Although the half amplitude pulse width PW50 of the isolated read pulse output can be improved shorter by increasing the coercivity, this tends to result in determination of the overwrite characteristic and compatibility between the high coercivity and the overwrite characteristic is limited.

In recent years, an anti-ferromagnetic coupling medium has been proposed as the technique of compatibilizing the thermal stability and the decrease of noises (see Patent document 3, Japanese Patent No. 3421632). This adopts a dual layered structure of anti-ferromagnetically coupling magnetic layers by way of a Ru intermediate layer and can set Brt lower while leaving the magnetic film thickness larger compared with a medium including a single magnetic layer. Accordingly, the medium noises can be decreased while maintaining the thermal stability. However, the combination of the techniques described above is still insufficient for attaining an areal recording density of 95 Mbits or more per 1 $mm^2$ and it is necessary to further improve the read output and decrease the medium noises.

To address these concerns, Patent document 4 (Japanese Patent Laid-Open No. 2003-85729 (FIG. 3)) proposes a magnetic recording medium having at least a first magnetic layer including a ferromagnetic material for controlling the anti-ferromagnetic exchange interaction, a second magnetic layer including a ferromagnetic material and a spacer layer formed between the first magnetic layer and the second magnetic layer for inducing the ferromagnetic exchange interaction on a substrate in which the second magnetic layer includes plural layers.

In Reference Example 1 described in page 7 of Patent document 4, the thickness of the lower magnetic layer 71 using a Co-20 at. % Cr-9 at. % Pt-3 at. % Ta alloy is set to 80 Å, and the thickness of the upper magnetic layer 72 using a Co-20 at. % Cr-12 at. % Pt-7 at. % B alloy is set to 70 Å. It is shown that since the thickness of the lower magnetic layer 71 is made larger than that of the thickness for the upper magnetic layer 72 while the coercivity Hc is lowered, the coercive squareness (S*), and the overwrite characteristic (O/W) are greatly improved and, further, pulse width (PW) is also improved compared with an AFC structure not provided with the lower magnetic layer 71.

Further, by interposing the lower magnetic layer of thin film thickness between the spacer layer and the upper magnetic layer, disturbance in the crystallographic orientation can be prevented in a case of forming the upper magnetic layer directly on the spacer layer. While this improves the coercive squareness (S*) and the pulse width (PW), the medium noises (S/N ratio) and thermal fluctuation characteristic are sometimes deteriorated. Since the lower magnetic layer having deviation for the lattice constant from that of the spacer layer includes disturbance of the crystallographic orientation, increase of the thickness for the lower magnetic layer causes increase of noises. Accordingly, it is shown that the lower magnetic layer is desirably as thin as possible in a state of keeping the effect of improving the orientation of the upper magnetic layer.

BRIEF SUMMARY OF THE INVENTION

The upper magnetic layer 72 shown in FIG. 3 of Patent document 4 has a composition of: Co-20 at. % Cr-12 at. % Pt-7 at. % B alloy, that is, the total for the concentrations of Co and Pt is 73%, and the total for the concentrations of Co and Pt in the lower magnetic layer 71 is from 77 to 82%. When the thickness of the lower magnetic layer 71 with the composition described above is increased, exchange coupling is increased in the lower magnetic layer which is remote from the head compared with the upper magnetic layer, to increase the medium noises.

The present invention intends to provide a longitudinal magnetic recording medium having a high medium S/N, with no problem in the overwrite characteristic, excellent in the bit error rate and sufficiently stable also in view of thermal fluctuation. Further, the invention intends to provide a magnetic memory device of high reliability capable of attaining an areal recording density of 95 Mbit or more per 1 mm² by combination with a magnetic head of higher sensitivity.

According to an aspect of the invention, there is provided a magnetic recording medium in which at least a first magnetic layer, a spacer layer including Ru as a main ingredient, a second magnetic layer, and a third magnetic layer are formed in contact with each other in this order on a substrate, wherein the thickness of the second magnetic layer is larger than that of the third magnetic layer and the total for the concentrations of cobalt and platinum contained in the second magnetic layer is not higher than the total for the concentrations of cobalt and platinum contained in the third magnetic layer.

The total for the concentrations of cobalt and platinum contained in the second magnetic layer may be from 68 at. % to 76 at. %. Platinum may be contained in all of the first magnetic layer, the second magnetic layer, and the third magnetic layer. Preferably, the concentration of platinum contained in the second magnetic layer is higher than the concentration of platinum contained in the first magnetic layer, and the concentration of platinum contained in the third magnetic layer is higher than the concentration of platinum contained in the second magnetic layer.

Preferably, the first magnetic layer includes an alloy containing Co—Cr, the second magnetic layer includes an alloy containing Co—Cr—Pt—B, and the third magnetic layer includes an alloy containing Co—Pt. A first underlayer including one of a Co—Ti alloy, a Co—Ti—Ni alloy and a Ni—Ta alloy, a second underlayer including a W—Co alloy or Ta, and a third underlayer including a Cr—Ti—B alloy or a Cr—Ti-alloy may be present between the substrate and the first magnetic layer.

According to another aspect of the invention, there is provided a magnetic memory device including: a magnetic recording medium in which at least a first magnetic layer, a spacer layer including Ru as a main ingredient, a second magnetic layer, and a third magnetic layer are formed in contact with each other in this order on a substrate, wherein the thickness of the second magnetic layer is larger than that of the third magnetic layer and the total for the concentrations of cobalt and platinum contained in the second magnetic layer is not higher than the total for the concentrations of cobalt and platinum contained in the third magnetic layer; a composite type head having a writing head and a magnetoresistive reading head for writing and reading data to and from the magnetic recording medium; and a positioning mechanism for positioning the composite type head to a radial direction of the magnetic recording medium.

Preferably, the total for the concentrations of cobalt and platinum contained in the second magnetic layer of the magnetic recording medium is from about 68 at. % to 76 at. %. Platinum may be contained in all of the first magnetic layer, the second magnetic layer, and the third magnetic layer of the magnetic recording medium. Preferably, the concentration of platinum contained in the second magnetic layer is higher than the concentration of platinum contained in the first magnetic layer, and the concentration of platinum contained in the third magnetic layer is higher than the concentration of platinum contained in the second magnetic layer of the magnetic recording medium.

In the magnetic recording medium described above, in a case of using a magnetic layer with addition of a ferromagnetic metal such as nickel or iron for the second magnetic layer and the third magnetic layer, the total for the concentration of the group of elements also containing ferromagnetic metal elements and the concentration of platinum may be compared between the second magnetic layer and the third magnetic layer. While addition of nickel to the magnetic layer can improve the corrosion resistance, the residual magnetic flux density was lowered relatively compared with a case of not adding nickel. While the addition of iron to the magnetic layer can increase the residual magnetic flux density, the corrosion resistance of the magnetic layer was deteriorated compared with the case of not adding iron. In view of the considerations described above, the ratio of cobalt and platinum constituting the magnetic layer is further studied specifically in the invention.

In a magnetic recording medium in which at least a first magnetic layer, a spacer layer including Ru as a main ingredient, a second magnetic layer, and a third magnetic layer are formed in contact with each other in this order on a substrate, when the thickness of the second magnetic layer is made larger than that of the third magnetic layer, the total for the concentrations of cobalt and platinum contained in the second magnetic layer is from about 68 at. % to 76 at. %, and the total for the concentrations of cobalt and platinum contained in the second magnetic layer is made not higher than the total for the concentrations of cobalt and platinum contained in the third magnetic layer, a magnetic recording medium having a coercivity of 300 kA/m or more can be attained and a medium capable of decreasing the thermal fluctuation and having a high output resolution can be obtained. In a case where the total for the concentrations of cobalt and platinum contained in the second magnetic layer is lower than 68 at. %, it is difficult to set the coercivity of the magnetic recording medium to 300 kA/m or more and maintain the high medium S/N. On the other hand, in a case where the total for the concentrations of cobalt and platinum contained in the second magnetic layer exceeds 76 at. %, since the thickness for the entire magnetic film is decreased, the effect of increasing the thickness of the second magnetic layer is not remarkable with a view point of the thermal fluctuation.

As the first magnetic layer, a Co—Cr alloy, Co—Cr—B alloy, Co—Cr—Pt alloy, Co—Cr—Ta alloy, etc. can be used. Particularly, in a medium in which the first magnetic layer and the second magnetic layer are anti-ferromagnetically coupled, when a magnetic layer containing platinum in the first magnetic layer is used, the medium noises can be decreased and a medium capable of decreasing the thermal fluctuation and having high power resolution, as well as with high medium S/N can be obtained.

In a case where the concentration of platinum contained in the second magnetic layer is higher compared with the concentration of platinum contained in the first magnetic layer and the concentration of platinum contained in the third magnetic layer is higher compared with the concentration of platinum contained in the second magnetic layer, since lattice matching property is improved, the crystallographic orientation can be improved which is more preferred for decreasing thermal fluctuation and attaining high output resolution and high medium S/N.

By forming the underlayer between the substrate and the first magnetic layer, it is possible to control the crystallographic orientation of the magnetic layer and refine the crystal grain. For example, a Cr alloy underlayer having a body-centered cubic structure can be used. Further, it is also possible to dispose a seed layer including, for example, a Co—Ti alloy, Co—Ni—Ti alloy, Ni—Ta alloy, W—Co alloy, etc. between the substrate and the underlayer.

As the substrate, it is preferred to use a chemically strengthened glass substrate or a rigid substrate formed by plating a phosphorus-containing nickel alloy to an aluminum alloy. It is preferred to apply fine texturing on the substrate substantially in the circumferential direction of a disk in view of providing magnetic anisotropy. In the surface roughness as measured in the radial direction of the disk, when a substrate with a maximum height Rmax of from 2.68 nm to 4.2 nm, and an average surface roughness Ra of from 0.23 nm to 0.44 nm is used, there is no problem in view of flying reliability as a result of measuring the size of 5 μm square by an intermittent-contact atomic force microscope.

The medium described above is a magnetic recording medium in which at least a first magnetic layer, a spacer layer including Ru as a main ingredient, a second magnetic layer and a third magnetic layer are formed in contact with each other in this order on a substrate, which can be prepared by sputtering using a target in which the thickness of the second magnetic layer is larger than that of the third magnetic layer, and the total for the concentrations of cobalt and platinum contained in the second magnetic layer is not more than the total for the concentrations of cobalt and platinum contained in the third magnetic layer. As the physical vapor deposition method, a method, for example, of RF sputtering or DC pulse sputtering is also effective in addition to the DC sputtering. In a case of using the DC sputtering method, it is preferred to apply a bias voltage upon forming the second magnetic layer and the third magnetic layer in view of the increase of the coercivity.

In a magnetic memory device including a magnetic recording medium prepared by the method described above, a driving unit for driving the magnetic recording medium, a magnetic head including a reading portion and a writing portion, a mechanism for relatively moving the magnetic head relative to the magnetic recording medium, a mechanism for ramping the head, a signal input module to the magnetic head and a writing/reading signal processing module for reading the output signal from the magnetic head, an areal recording density of 95 Mbits or more per 1 $mm^2$ can be attained by using a magnetic head having a reading portion constituted with a plural conductive magnetic film causing large change of resistance by the relative change in the direction of magnetization to each other by the external magnetic field and a conductive non-magnetic film disposed between the conductive magnetic films.

In addition to the second magnetic layer and the third magnetic layer, a magnetic layer can be stacked further. In this case, it may be formed such that a layer in which the total for the concentration of the group of ferromagnetic metal elements and the concentration of platinum is highest is in contact with the protective layer when two optional adjacent layers are compared. For example, in a magnetic recording medium in which at least a first magnetic layer, a spacer layer including Ru as a main ingredient, a second magnetic layer, a third magnetic layer, and a fourth magnetic layer are formed in contact with each other in this order on a substrate, it is preferred that the thickness of the second magnetic layer is larger than that of the third magnetic layer, the total for the concentration of the ferromagnetic metal elements and the concentration of platinum containing in the second magnetic layer is not more than the total for the concentration of the ferromagnetic metal elements and the concentration of platinum containing in the third magnetic layer and, further, the total for the concentration of the ferromagnetic metal elements and the concentration of platinum contained in the third magnetic layer is not more than the total for the concentration of the ferromagnetic metal elements and the concentration of platinum contained in the fourth magnetic layer. It is more preferred that the thickness of the third magnetic layer is larger than that of the fourth magnetic layer.

This invention can provide a longitudinal magnetic recording medium having a high medium S/N, with no problems in view of the overwrite characteristic, excellent in the bit error rate and sufficiently stable also to thermal fluctuations and further can provide a magnetic memory device of high reliability capable of attaining an areal recording density of 95 Mbits or more per 1 $mm^2$ by combination with a magnetic head at higher sensitivity.

DETAILED DESCRIPTION OF THE INVENTION

Specific embodiments of the invention are to be described in details with reference to the drawings.

EXAMPLE 1

Figure 1:
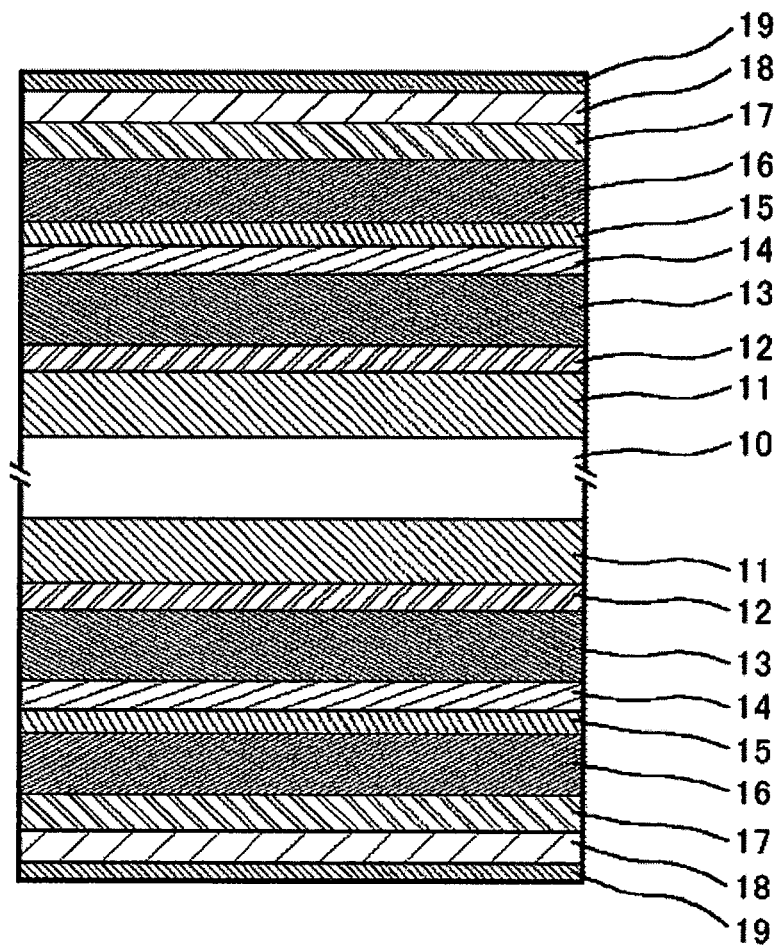
FIG. 1 is a cross sectional structural view of a magnetic recording medium according to an embodiment of the invention.

FIG. 1 shows a cross sectional structural view of a magnetic recording medium according to Example 1 of the invention. After alkali cleaning an alumino silicate glass substrate 10 chemically strengthened at the surface and drying the same, a Co-50 at. % Ti alloy of 15 nm thickness as a first underlayer 11, and a W-30 at. % Co alloy layer of 3 nm thickness as a second underlayer 12 were formed at room temperature. After heating the substrate by a lamp heater to a temperature of about 240° C. to 300° C., a Cr-10 at. % Ti-3 at. % B alloy of 8 nm thickness was formed as a third underlayer 13. Further, a first magnetic layer 14 including a Co-14 at. % Cr-6 at. % Pt alloy of 3 nm thickness, a Ru intermediate layer 15 of 0.6 nm thickness, and a second magnetic layer 16 including a Co—Cr—Pt—B alloy were formed successively, a third magnetic layer 17 containing at least platinum and cobalt was formed and a film 18 of 3.2 nm thickness including carbon as a main ingredient was formed as a protective layer. After forming the carbon film, a lubricant agent including a perfluoroalkyl polyether as a main ingredient was coated to form a lubricant layer 19 of 1.8 nm thickness. The multi-layered film described above was formed by using a single-wafer sputtering apparatus. The base vacuum degree of the sputtering apparatus was $1.0 \times 10^{-5}$ to $1.2 \times 10^{-5}$ Pa, and the tact time was set to 9 sec. The first underlayer through the third magnetic layer were formed in an Ar gas atmosphere at 0.93 Pa. Heating was conducted in a mixed gas atmosphere including Ar with addition of 1% oxygen, and the carbon protective film was formed in a mixed gas atmosphere including Ar with addition of 10% nitrogen.

Figure 1A:
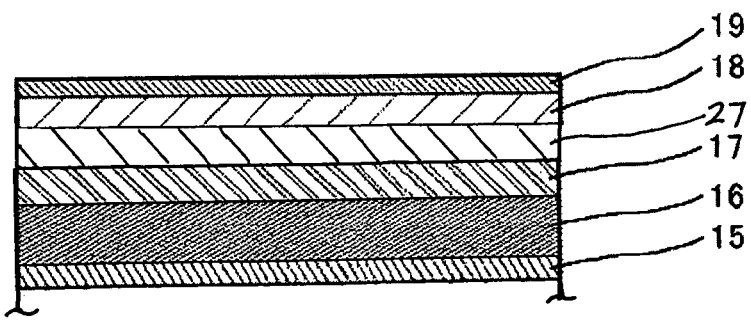
FIG. 1a is a cross sectional structural view of a portion of a magnetic recoding medium according to another embodiment of the invention.

FIG. 1a shows another embodiment in which a fourth magnetic layer 27 is formed on the third magnetic layer 17.

With respect to the shape of the substrate 10, for example, a substrate having 84 mm of outer diameter, 25 mm of inner diameter, 1.27 mm of thickness, 3.5 nm of maximum height Rmax, and 0.35 nm of mean surface roughness Ra or having 65 mm of outer diameter, 20 mm of inner diameter, 0.635 mm of thickness, from 2.68 to 4.0 nm of Rmax, and from 0.23 nm to 0.44 nm of Ra can be used with no particular restriction on the shape. The surface roughness measured in the radial direction of the disk was determined by observing the size for 5 μm square by an intermittent-contact atomic force microscope.

As the first underlayer 11, a Co-50 at. % Ti-10 at. % Ni alloy or Ni-38 at. % Ta alloy can also be used. It is preferred that the thickness is larger than 10 nm in view of the reliability for sliding movement and it is preferred that the thickness is about 30 nm or less in view of productivity. In addition, a microcrystalline or amorphous metal thin film may also be provided aside from the composition described above.

For the second underlayer, Ta may also be used. Since the mechanical reliability is deteriorated when the thickness of the second underlayer is excessively large, it is preferably 5 nm or less.

As the third underlayer, a Cr—Ti alloy not containing B may also be used. For refining crystal grains in an electric discharge atmosphere with no intentional addition of oxygen or nitrogen, it is preferred to add boron to the third underlayer. The concentration for the addition of boron can be selected such that the coercivity has a desired value. When boron is added in excess of 10 at. %, the crystal grain size is refined excessively.

As the first magnetic layer, a Co—Cr alloy, Co—Cr—B alloy, Co—Cr—Pt alloy, Co—Cr—Ta alloy, etc. can be used. The addition concentration of Cr is preferably from 10% to 20%.

It may suffice that the Ru intermediate layer 15 contain Ru as the main ingredient. The thickness of the intermediate layer 15 is preferably such that the first magnetic layer and the second magnetic layer are anti-ferromagnetically coupled and it is not restricted to 0.6 nm.

As the second magnetic layer, the second magnetic layer was formed by using a Co-22 at. % Cr-14 at. % Pt-4 at. % B-2 at. % Ta, Co-23 at. % Cr-13 at. % Pt-5 at. % B, and Co-20 at. % Cr-12 at. % Pt-6 at. % B alloy target. On the second magnetic layer, a third magnetic layer was formed by using the following alloy targets shown in Table 1 while applying a bias at −200 V.

Co-12 at. % Cr-13 at. % Pt-8 at. % B, Co-12 at. % Cr-13 at. % Pt-10 at. % B,
Co-12 at. % Cr-13 at. % Pt-12 at. % B,
Co-12 at. % Cr-13 at. % Pt-16 at. % B, Co-11 at. % Cr-13 at. % Pt-15 at. % B,
Co-10 at. % Cr-13 at. % Pt-10 at. % B,
Co-10 at. % Cr-13 at. % Pt-12 at. % B, Co-10 at. % Cr-13 at. % Pt-14 at. % B,
Co-8 at. % Cr-13 at. % Pt-12 at. % B, Co-8 at. % Cr-13 at. % Pt-14 at. % B, Co-8 at. % Cr-13 at. % Pt-16 at. % B, Co-6 at. % Cr-13 at. % Pt-16 at. % B.

As the second magnetic layer, Co-22 at. % Cr-14 at. % Pt-4 at. % B-2 at. % Ta alloy was used, which was combined with the alloy magnetic layers shown in Table 1 as the third magnetic layer to form magnetic recording media. Table 2 shows relations between the composition and the thickness, and the magnetic characteristic and crystallographic orientation of the third alloy magnetic layers used for the magnetic recording media.

As the second magnetic layer, a Co-23 at. % Cr-13 at. % Pt-5 at. % B alloy was used, which was combined with the alloy magnetic layer shown in Table 1 as the third magnetic layer to form magnetic recording media. Table 3 shows the relations between the composition and the thickness, and the magnetic characteristic and crystallographic orientation of the third alloy magnetic layers used for the magnetic recording media. Bias voltage at −200 V was applied in each of the cases except for changing the bias application voltage upon forming the second magnetic layer in Test Examples 210 to 212, 217 to 219 to form second magnetic layers.

It was found that even when the total for the concentrations of cobalt and platinum was constant at 72% for the second magnetic layer, KV/kT (index for thermal fluctuation) was larger and Δθ50 showing the crystallographic orientation was smaller in those shown in Table 2 not depending on the composition of the third magnetic layer. That is, KV/kT can be larger and Δθ50 can be smaller in a case of using Co-22 at. % Cr-14 at. % Pt-4 at. % B-2 at. % Ta (Table 2) as the second magnetic layer, compared with the case of using Co-23 at. % Cr-13 at. % Pt-5 at. % B (Table 3) as the second magnetic layer.

While KV/kT is smaller in Comparative Examples 220, 231 when the thickness of the second magnetic layer is smaller compared with the thickness of the third magnetic layer in Table 3, whereas KV/kT increases in a case where the thickness of the second magnetic layer is larger compared with the thickness of the third magnetic layer.

A magnetic recording medium was formed by using a Co-20 at. % Cr-12 at. % Pt-6 at. % B alloy as the second magnetic layer, which was combined with the alloy magnetic layer shown in Table 1 as the third magnetic layer to form magnetic recording media. Table 4 shows relations between the composition and the film thickness, and the magnetic characteristic and the crystallographic orientation of the third alloy magnetic layer used as the magnetic recording media. Bias voltage at −200 V was applied to all of the layers except for changing the bias application voltage upon forming the second magnetic layer in Test Examples 310 to 312, and 317 to 319.

The electric power supplied to the heater was changed in accordance with the composition of the second magnetic layer, to set the center value for the coercivity measured by FRMM to about 342 kA/m to 366 kA/m. The magnetic characteristics of Brt, remanence coercivity Hcr and squareness ratio S' shown in Table 2, Table 3 and Table 4 were measured by using FRMM. The 110 diffraction peak for the hcp structure due to the magnetic layer was put to ω scanning to obtain the half maximum full—width Δθ50 for diffraction peak by copper characteristics X-rays (Cu—Kα rays). KV/kT as an index of the thermal fluctuation was determined by measuring the time dependence of the remanence coercivity by a vibrating sample magnetometer (VSM). BrOR showing the ratio for the circumferential direction and the radial direction of Brt was measured by VSM. An external magnetic field at 796 kA/m was applied to a sample cut into 8 mm square and Brt was determined by measurement at room temperature.

For the magnetic recording media, electromagnetic conversion characteristics were evaluated under the conditions shown in Table 5. The gap length between the writing magnetic poles was set to 80 nm. The distance between the shield layers for the reading head was set to 66 nm.

Table 6 shows the results of evaluation by using the head 51. The output resolution in Table 6 shows the ratio of written and read output at a recording density one-half of the highest linear recording density relative to the isolated read pulse output. Further, logBER is the logarithmic expression for the bit error rate.

Test Examples 242, 263, and 303 in Table 6 show smaller medium S/N and have smaller logBER values as the absolute value compared with other test examples. In common with each of the media, the ratio of cobalt and platinum in the third magnetic layer is as high as 80%. For further improving the logBER and the medium S/N under the conditions for the head 51, it is preferred to decrease the ratio of cobalt and platinum in the third magnetic layer to less than 80%.

Test Examples 242 and 243 are compared. By further decreasing the thickness of the third magnetic layer compared with the thickness of the second magnetic layer, the medium S/N and the logBER can be improved while maintaining the overwrite performance and KV/kT as the index of the thermal fluctuations.

Test Examples 263 and 265 are compared. By further decreasing the thickness of the third magnetic layer compared with the thickness of the second magnetic layer, KV/kT is decreased from 103 to 89.2. KV/kT=89.2 is a sufficiently large value in view of the thermal fluctuations. The overwrite characteristic was improved from −32.5 dB to −35.8 dB and the medium S/N is also improved from 20.4 dB to 21.1 dB by decreasing Hcr from 363 kA/m to 325 kA/m.

Table 7 and Table 8 show the results of evaluation by using heads 52 and 53, respectively.

Among the results shown in Table 7, Comparative Example 336 and Comparative Example 266 show low medium S/N. In each of the media, the thickness of the second magnetic layer is smaller than the thickness of the third magnetic layer.

Comparative Examples 366 and 367, and Test Examples 368 to 370 are compared. As shown in Table 4, when the thickness of the second magnetic layer is increased from 4.0 nm to 14.6 nm and, at the same time, the thickness of the third magnetic layer is decreased from 8.3 nm to 1.8 nm while maintaining the magnetic characteristic substantially identical, the overwrite characteristic is improved from −25.8 dB to −30.3 dB as shown in Table 7. The medium S/N is also improved from 16.6 dB to 20.2 dB. The logBER is also improved from −2.7 to −4.2.

Also in the comparison of Comparative Example 351 and Test Examples 352 to 355, it is shown that the overwrite characteristic, the medium S/N and the logBER can be improved within a range with no problem for the lowering of KV/kT by increasing the thickness of the second magnetic layer and, at the same time, decreasing the thickness of the third magnetic layer. Such a relation can be found also in many test examples not restricted between Comparative Examples 266 and Test Examples 267 to 270, or between Comparative Example 251 and Test Examples 252 to 255 and Test Examples 171 to 174.

Also in the result in Table 8, it is shown that the overwrite characteristic, the medium S/N and the logBER can be improved within a range with no problem for the lowering of KV/kT by increasing the thickness of the second magnetic layer and at the same time decreasing the thickness of the third magnetic layer, compared with Comparative Example 241 and Comparative Example 261.

The effect of improving the logBER in Table 8 was remarkable, for example, in Test Example 250, Test Example 139 and Test Example 134. Further, the effect for improving the medium S/N in Table 8 was remarkable in Test Example 250, Test Example 345, and Test Example 139. The compositions for the third magnetic layers of the media were Co-10 at. % Cr-13. at. % Pt-12 at. % B, or Co-10 at. % Cr-13 at. % Pt-10 at. % B.

EXAMPLE 2

In a case of using a Co-18 at. % Cr-12 at. % Pt-6 at. % B alloy as the second magnetic layer, the total for the concentrations of Co and Pt is 76%. Using the composition as the composition for the second magnetic layer, magnetic recording media were formed while changing the composition and the film thickness of the third magnetic layer. Table 9 shows relations between the composition and the magnetic characteristic of the third magnetic layer.

The electromagnetic conversion characteristics were evaluated for the magnetic recording media having the magnetic characteristics described above by using the head 54 shown in Table 5. Table 10 shows the results.

From the comparison between Test Examples 441 and 442 it was found that the overwrite characteristic, the medium S/N and the bit error rate logBER as the logarithmic expression are improved in a case where the thickness of the second magnetic layer is increased. In a case of using a Co-18 at. % Cr-12 at. % Pt-6 at. % B alloy for the second magnetic layer, a favorable bit error rate was obtained in a case of using a third magnetic layer in which the total for the concentrations of Co and Pt is not less than 76% which is the total of for the concentrations of Co and Pt in the second magnetic layer.

EXAMPLE 3

In a case of using a Co-24 at. % Cr-14. at. % Pt-6 at. % B-2 at. % Ta alloy as the second magnetic layer, the total for the concentrations of Co and Pt is 68%. In a case of using a Co-12 at. % Cr-12 at. % Pt-10 at. % B alloy for the third magnetic layer, the total for the concentrations of Co and Pt occupied in the third magnetic layer is 78%. Magnetic recording media were formed while changing the thickness of the magnetic layers and setting the heater power to 2.4 kW (Table 11). A bias voltage at −200 V was applied upon forming the second magnetic layer and the third magnetic layer except for Test Example 505. In Test Example 505, a bias voltage at −200V was applied upon forming the second magnetic layer and a bias voltage was not applied upon forming the third magnetic film. Electromagnetic conversion characteristics were evaluated for the magnetic recording media using the head 55 shown in Table 5. Table 11 shows the results.

When the Test Example 502 and the Test Example 505 were compared, even when bias voltage was not applied upon forming the third magnetic film, favorable electromagnetic conversion characteristics identical with those by bias application were obtained. In Test Example 501, since the thickness of the second magnetic layer was similar to the thickness of the third magnetic layer, the medium S/N was somewhat deteriorated. In view of the results, it was found that the medium S/N can be improved without deteriorating the overwrite characteristics while maintaining KV/kT as the thermal fluctuation index as it is by decreasing the thickness of the third magnetic layer.

EXAMPLE 4

A magnetic layer including a Co-20 at. % Cr-12 at. % Pt-6 at. % B alloy was formed as the second magnetic layer to a thickness of 7 nm, and a magnetic layer including a Co-12 at. % Cr-13 at. % Pt-12 at. % B alloy was formed as the third magnetic layer to a thickness of 3.5 nm, and, after forming a magnetic layer including a Co-8 at. % Cr-13 at. % Pt-12 at. % B alloy as the fourth magnetic layer to a thickness of 2.8 nm, a protective layer was formed. A bias voltage at −200 V was applied in the formation for each of the second magnetic layer, the third magnetic layer and the fourth magnetic layer. The total for the concentrations of cobalt and platinum was 74%, 76%, and 80% for the second magnetic layer, the third magnetic layer and the fourth magnetic layer respectively in this order. A layer in which the total for the concentration of cobalt belonging to the group of ferromagnetic metal elements and the concentration of platinum was maximum was formed so as to be in contact with the protective layer. Further, the thickness of the second magnetic layer was made larger than that of the third magnetic layer and the thickness of the third magnetic layer was made larger than that of the fourth magnetic layer. At the same time, the total for the concentrations of the ferromagnetic metal element and platinum contained in the second magnetic layer was made not more than the total for the concentrations of the ferromagnetic metal element and platinum contained in the third magnetic layer and, further, the total for the concentrations of the ferromagnetic metal element and the platinum contained in the third magnetic layer was made not more than the total for the concentrations of the ferromagnetic metal element and the platinum contained in the fourth magnetic layer. The medium had 4.97 T·nm of Brt, 385 kA/m of coercivity Hcr, and 0.81 of squareness ratio S'. Δθ50 was 4.1 degree showing favorable in-plane orientation. KV/kT was 93 and BrOR was 1.28.

EXAMPLE 5

A magnetic recording medium was formed in the same manner as in Example 1 while setting the bias voltage to −200 V except for the case of using a Co-23 at. % Cr-13 at. % Pt-5 at. % B-2 at. % Ta alloy as the second magnetic layer. That is, the total for the concentrations of Co and Pt in the second magnetic layer was 70%. As a result of forming the medium so as to provide: Brt=5.0 T·nm (about), larger KV/kT compared with KV/kT described in Table 3 and smaller Δθ50 were obtained irrespective of the composition of the third magnetic layer.

Figure 2:
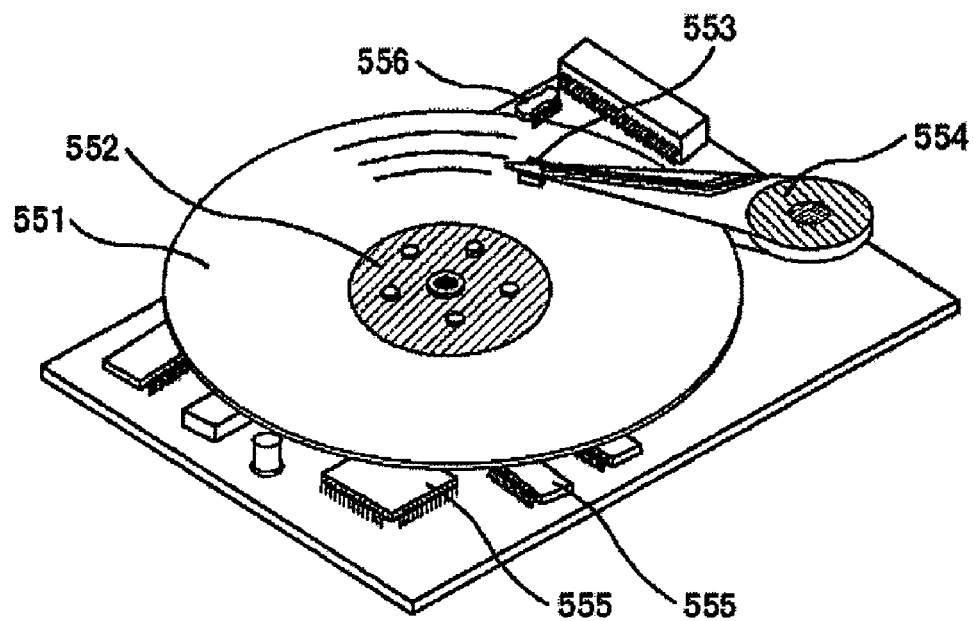
FIG. 2 is a schematic constitutional view of a magnetic memory device using the magnetic recording medium according to the invention.

As shown in FIG. 2, a magnetic memory device including a magnetic recording medium 551 of Examples 1 to 5 described above, a driving system 552 for driving the magnetic recording medium, a magnetic head 553 including writing and reading portions, a positioning mechanism 554 for relatively, moving the magnetic head to the magnetic recording medium and positioning the same at a radial position, a signal inputting module to the magnetic head, a writing/reading signal processing circuit 555 for conducting output signals from the magnetic head and a ramp mechanism 556 that retracts during the unloading state was constituted.

Figure 3:
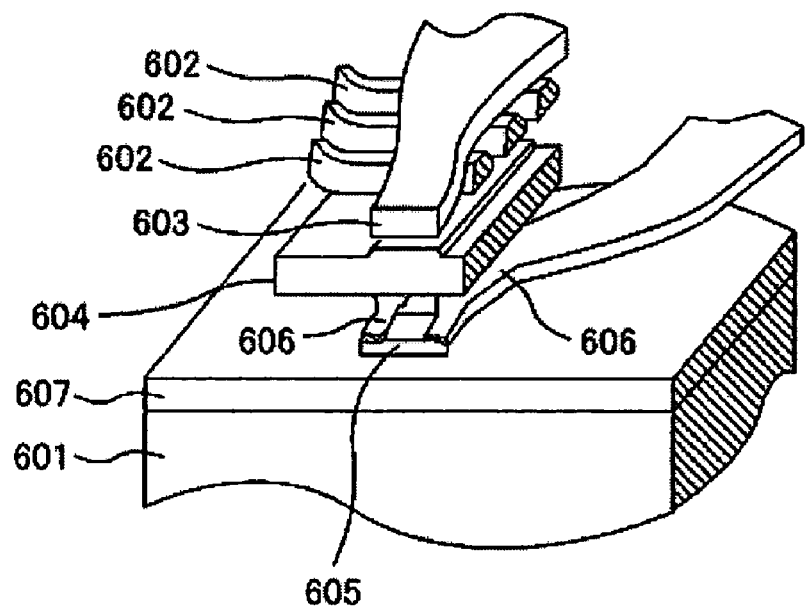
FIG. 3 is a perspective view showing a schematic structure of a magnetic head.

The reading portion of the magnetic head was constituted with a magnetoresistive head. FIG. 3 is a schematic perspective view showing the structure of a magnetic head. The head is a composite type head having an electromagnetic induction type head for recording and a magnetoresistive head for reading formed on a substrate 601. The writing head including an upper writing magnetic pole 603 and a lower writing magnetic pole and an upper shield layer 604 for sandwiching coils 602, with the gap length between the writing magnetic poles being set to 80 nm. Copper of 3 μm thickness was used for the coils. The reading head including a magnetoresistive sensor 605 and electrode patterns 606 on both ends thereof in which the magnetoresistive sensor was put between the lower writing magnetic pole and upper shield layer 604 and a lower shield layer 607, with the distance between the two shield layers being set to 66 nm. In the drawing, the gap layer between the writing magnetic poles, and the gap layer between the shield layer and the magnetoresistive sensor are not illustrated.

Figure 4:
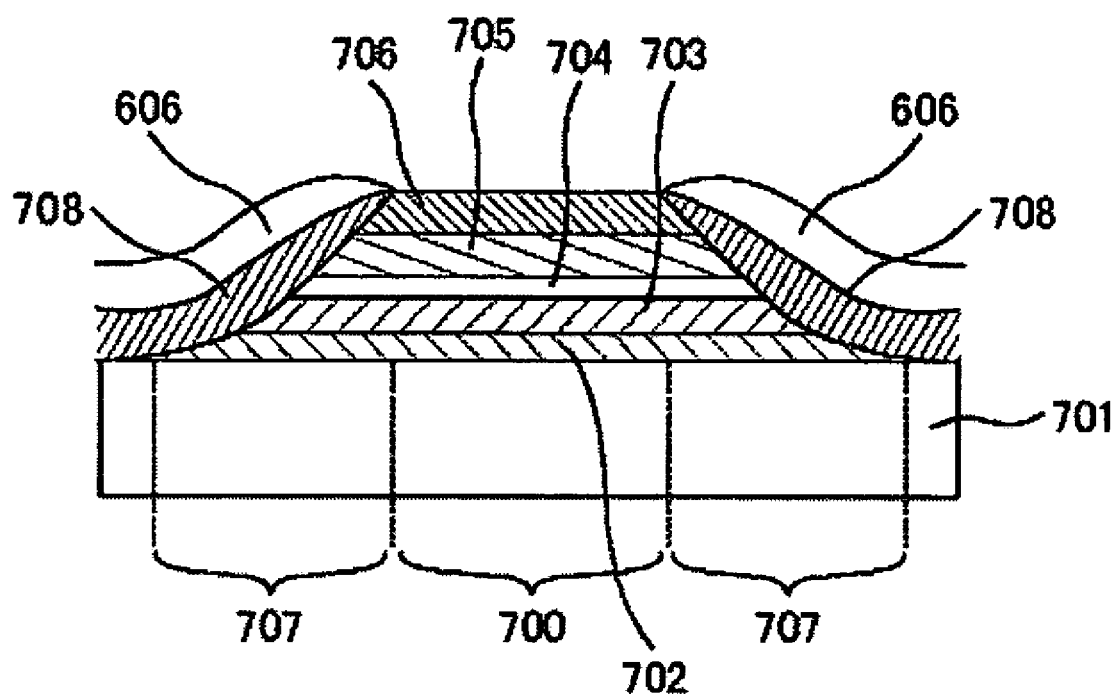
FIG. 4 is a cross sectional structural view of a magnetoresistive sensor.

FIG. 4 shows a cross sectional structure of the magnetoresistive sensor. A signal detection region 700 of the magnetic sensor includes plural conductive magnetic films causing large change of resistance due to the change of the direction of magnetization relative to each other by external magnetic fields and a magnetoresistive sensor (spin-valve type reading element) containing a conductive non-magnetic film disposed between the conductive magnetic films. The magnetic sensor had a structure in which a Ta buffer layer 702, a first magnetic film 703, an intermediate layer 704 composed of copper, a second magnetic film 705, and an anti-ferromagnetic layer 706 including an Fe-50 at. % Mn alloy formed successively on a gap layer 701. A Ni-20 at. % Fe alloy was used for the first magnetic film and cobalt was used for the second magnetic film. The magnetization in the second magnetic film was fixed to one direction by the exchange magnetic field from the anti-ferromagnetic film. On the contrary, since the direction of magnetization in the first magnetic film in contact with the second magnetic film by way of the non-magnetic film is changed by the leak magnetic field from the magnetic recording medium, change of resistance is caused.

A tapered portion 707 fabricated into a tapered shape was present on both ends of the signal detection region. The tapered portion includes a permanent magnetic layer 708 for forming the first magnetic film into a single magnetic domain and a pair of electrodes 606 formed thereon for taking out signals. It is necessary that the permanent magnet layer has large coercivity and the direction of magnetization does not change easily, and a Co—Cr—Pt alloy was used.

In a case of using any of the media of Examples 1 to 5, recording density of 95 Mbits or more per 1 mm² could be obtained by the magnetic memory device constituted as described above.

In this example, a magnetic head in which a magnetoresistive head was formed on a magnetic head slider with the area of air bearing surface rails of 1.4 mm² or less and with a mass of 2 mg or less was used. The impact shock reliability could be improved by decreasing the area for the air bearing surface rails of the slider to 1.4 mm² or less and, further, decreasing the mass to 2 mg or less. This could make high recording density and high impact resistance compatible, and a mean trouble time interval (MTBF) of 300,000 hours or more could be attained at a recording density of 95 Mbits or more per 1 mm².

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

TABLE 1

| | Second magnetic layer | | |
| --- | --- | --- | --- |
| Third magnetic layer | Co-22 at. % Cr-14 at. % Pt-4 at. % B-2 at. % Ta | Co-23 at. % Cr-13 at. % Pt-5 at. B | Co-20 at. % Cr-12 at. % Pt-6 at. B |
| Co-12 at. % Cr-13 at. % Pt-8 at. % B | Test Examples 101-105 | Test Examples 201-204 | Test Examples 301-305 |
| Co-12 at. % Cr-13 at. % Pt-10 at. % B | Test Examples 106-110 | Test Examples 206-212 Comparative Example 205 | Test Examples 306-312 |
| Co-12 at. % Cr-13 at. % Pt-12 at. % B | Test Examples 111-115 | Test Examples 213-219 | Test Examples 314-319 Comparative Example 313 |
| Co-12 at. % Cr-13 at. % Pt-16 at. % B | Test Examples 116-117 | Test Examples 221, 222 Comparative Example 220 | — |
| Co-11 at. % Cr-13 at. % Pt-15 at. % B | Test Examples 121-124 | Test Examples 232-234 Comparative Example 231 | Test Examples 331-334 |

TABLE 1-continued

| Third magnetic layer | Second magnetic layer | | |
|---|---|---|---|
| | Co-22 at. % Cr-14 at. % Pt-4 at. % B-2 at. % Ta | Co-23 at. % Cr-13 at. % Pt-5 at. % B | Co-20 at. % Cr-12 at. % Pt-6 at. % B |
| Co-10 at. % Cr-13 at. % Pt-10 at. % B | Test Examples 131-135 | Test Examples 242-245 Comparative Example 241 | Test Examples 341-345 |
| Co-10 at. % Cr-13 at. % Pt-12 at. % B | Test Examples 136-140 | Test Examples 247-250 Comparative Example 246 | Test Examples 346-350 |
| Co-10 at. % Cr-13 at. % Pt-14 at. % B | Test Examples 141-144 | Test Examples 252-255 Comparative Example 251 | Test Examples 352-355 Comparative Example 351 |
| Co-8 at. % Cr-13 at. % Pt-12 at. % B | Test Examples 151-155 | Test Examples 262-265 | Test Examples 361-365 Comparative Example 261 |
| Co-8 at. % Cr-13 at. % Pt-14 at. % B | Test Examples 156-159 | Test Examples 267-270 Comparative Example 266 | Test Examples 368-370 Comparative Examples 366, 367 |
| Co-8 at. % Cr-13 at. % Pt-16 at. % B | Test Examples 160-164 | — | Test Examples 371-375 |
| Co-6 at. % Cr-13 at. % Pt-16 at. % B | Test Examples 171-175 | Test Examples 271-273 | Test Examples 381-385 |

TABLE 2

| Test Example | Heater (kW) | Thickness of second magnetic layer (nm) | Third magnetic layer | | | | | Thickness (nm) | Brt (T·nm) | Hcr (kA/m) | S' | Δθ50 (deg) | KV/kT | BrOR |
|---|---|---|---|---|---|---|---|---|---|---|---|---|---|---|
| | | | Co | Cr | Pt | B | Co + Pt | | | | | | | |
| 101 | 2.00 | 8.9 | 67 | 12 | 13 | 8 | 80 | 7.0 | 5.04 | 409 | 0.87 | | | |
| 102 | ↑ | 10.2 | ↑ | ↑ | ↑ | ↑ | ↑ | 6.5 | 5.10 | 384 | 0.87 | | 116 | 1.26 |
| 103 | ↑ | 11.5 | ↑ | ↑ | ↑ | ↑ | ↑ | 6.0 | 4.98 | 354 | 0.87 | 4.28 | 112 | 1.23 |
| 104 | ↑ | 12.8 | ↑ | ↑ | ↑ | ↑ | ↑ | 5.5 | 4.96 | 328 | 0.86 | | 111 | 1.26 |
| 105 | ↑ | 14.1 | ↑ | ↑ | ↑ | ↑ | ↑ | 5.1 | 5.05 | 308 | 0.85 | | | |
| 106 | 1.90 | 8.9 | 65 | 12 | 13 | 10 | 78 | 7.9 | 4.96 | 408 | 0.85 | | | |
| 107 | ↑ | 10.2 | ↑ | ↑ | ↑ | ↑ | ↑ | 7.3 | 4.79 | 376 | 0.83 | | 103 | 1.25 |
| 108 | ↑ | 11.5 | ↑ | ↑ | ↑ | ↑ | ↑ | 6.8 | 4.90 | 351 | 0.84 | 4.69 | 102 | 1.26 |
| 109 | ↑ | 12.8 | ↑ | ↑ | ↑ | ↑ | ↑ | 6.3 | 4.77 | 326 | 0.82 | | 100 | 1.23 |
| 110 | ↑ | 14.1 | ↑ | ↑ | ↑ | ↑ | ↑ | 5.8 | 4.70 | 301 | 0.83 | | | |
| 111 | 1.90 | 8.9 | 63 | 12 | 13 | 12 | 76 | 8.7 | 4.87 | 421 | 0.82 | | | |
| 112 | ↑ | 10.2 | ↑ | ↑ | ↑ | ↑ | ↑ | 8.0 | 4.94 | 391 | 0.82 | | 107 | 1.25 |
| 113 | ↑ | 11.5 | ↑ | ↑ | ↑ | ↑ | ↑ | 7.4 | 4.91 | 360 | 0.82 | 4.67 | 105 | 1.28 |
| 114 | ↑ | 12.8 | ↑ | ↑ | ↑ | ↑ | ↑ | 6.8 | 4.83 | 330 | 0.82 | | 107 | 1.31 |
| 115 | ↑ | 14.1 | ↑ | ↑ | ↑ | ↑ | ↑ | 6.2 | 4.83 | 303 | 0.82 | | | |
| 116 | 2.45 | 11.5 | 59 | 12 | 13 | 16 | 72 | 10.2 | 5.14 | 353 | 0.81 | 3.98 | 91 | 1.31 |
| 117 | ↑ | 12.8 | ↑ | ↑ | ↑ | ↑ | ↑ | 9.4 | 5.07 | 335 | 0.79 | | 94 | 1.31 |
| 121 | 2.15 | 10.2 | 61 | 11 | 13 | 15 | 74 | 9.5 | 4.96 | 380 | 0.82 | | 92 | 1.27 |
| 122 | ↑ | 11.5 | ↑ | ↑ | ↑ | ↑ | ↑ | 8.8 | 4.94 | 357 | 0.82 | 4.52 | 95 | 1.27 |
| 123 | ↑ | 12.8 | ↑ | ↑ | ↑ | ↑ | ↑ | 8.1 | 4.96 | 335 | 0.82 | | 97 | 1.28 |
| 124 | ↑ | 14.1 | ↑ | ↑ | ↑ | ↑ | ↑ | 7.4 | 5.02 | 313 | 0.82 | | | |
| 131 | 2.00 | 8.9 | 67 | 10 | 13 | 10 | 80 | 6.5 | 5.15 | 411 | 0.88 | | | |
| 132 | ↑ | 10.2 | ↑ | ↑ | ↑ | ↑ | ↑ | 6.1 | 5.04 | 384 | 0.88 | | 115 | 1.24 |
| 133 | ↑ | 11.5 | ↑ | ↑ | ↑ | ↑ | ↑ | 5.6 | 4.96 | 355 | 0.87 | 4.34 | 111 | 1.22 |
| 134 | ↑ | 12.8 | ↑ | ↑ | ↑ | ↑ | ↑ | 5.1 | 4.83 | 332 | 0.87 | | 107 | 1.24 |
| 135 | ↑ | 14.1 | ↑ | ↑ | ↑ | ↑ | ↑ | 4.6 | 4.84 | 306 | 0.86 | | | |
| 136 | 2.00 | 8.9 | 65 | 10 | 13 | 12 | 78 | 7.2 | 5.05 | 429 | 0.87 | | | |
| 137 | ↑ | 10.2 | ↑ | ↑ | ↑ | ↑ | ↑ | 6.7 | 4.97 | 399 | 0.87 | | 116 | 1.25 |
| 138 | ↑ | 11.5 | ↑ | ↑ | ↑ | ↑ | ↑ | 6.2 | 4.92 | 365 | 0.86 | 4.40 | 111 | 1.23 |
| 139 | ↑ | 12.8 | ↑ | ↑ | ↑ | ↑ | ↑ | 5.7 | 4.94 | 340 | 0.86 | | 111 | 1.27 |
| 140 | ↑ | 14.1 | ↑ | ↑ | ↑ | ↑ | ↑ | 5.3 | 4.94 | 310 | 0.84 | | | |
| 141 | 2.0 | 9.3 | 63 | 10 | 13 | 14 | 76 | 8.1 | 5.01 | 414 | 0.86 | | 106 | 1.27 |
| 142 | ↑ | 11.5 | ↑ | ↑ | ↑ | ↑ | ↑ | 7.2 | 4.98 | 364 | 0.85 | 4.37 | 110 | 1.22 |
| 143 | ↑ | 13.7 | ↑ | ↑ | ↑ | ↑ | ↑ | 6.2 | 4.85 | 318 | 0.82 | | 104 | 1.25 |
| 144 | ↑ | 15.9 | ↑ | ↑ | ↑ | ↑ | ↑ | 5.3 | 4.75 | 285 | 0.80 | | | |
| 151 | 2.0 | 8.9 | 67 | 8 | 13 | 12 | 80 | 6.3 | 4.98 | 406 | 0.89 | | | |
| 152 | ↑ | 10.2 | ↑ | ↑ | ↑ | ↑ | ↑ | 5.9 | 4.97 | 385 | 0.89 | | 114 | 1.25 |

TABLE 2-continued

| Test Example | Heater (kW) | Thickness of second magnetic layer (nm) | Third magnetic layer | | | | | | | | | | | |
|---|---|---|---|---|---|---|---|---|---|---|---|---|---|---|
| | | | Co | Cr | Pt | B | Co + Pt | Thickness (nm) | Brt (T·nm) | Hcr (kA/m) | S' | Δθ50 (deg) | KV/kT | BrOR |
| 153 | ↑ | 11.5 | ↑ | ↑ | ↑ | ↑ | ↑ | 5.5 | 4.95 | 359 | 0.89 | 4.44 | 111 | 1.23 |
| 154 | ↑ | 12.8 | ↑ | ↑ | ↑ | ↑ | ↑ | 5.1 | 4.82 | 333 | 0.88 | | 106 | 1.25 |
| 155 | ↑ | 14.1 | ↑ | ↑ | ↑ | ↑ | ↑ | 4.7 | 4.83 | 307 | 0.87 | | | |
| 156 | 2.00 | 9.3 | 65 | 8 | 13 | 14 | 78 | 7.1 | 5.19 | 412 | 0.89 | | 109 | 1.21 |
| 157 | ↑ | 11.5 | ↑ | ↑ | ↑ | ↑ | ↑ | 6.3 | 4.96 | 362 | 0.88 | 4.46 | 109 | 1.24 |
| 158 | ↑ | 13.7 | ↑ | ↑ | ↑ | ↑ | ↑ | 5.5 | 4.80 | 320 | 0.87 | | 104 | 1.27 |
| 159 | ↑ | 15.9 | ↑ | ↑ | ↑ | ↑ | ↑ | 4.6 | 4.68 | 284 | 0.83 | | | |
| 160 | 2.15 | 8.9 | 63 | 8 | 13 | 16 | 76 | 7.5 | 4.95 | 412 | 0.88 | | 103 | 1.27 |
| 161 | ↑ | 10.2 | ↑ | ↑ | ↑ | ↑ | ↑ | 7.1 | 4.94 | 388 | 0.87 | | 105 | 1.26 |
| 162 | ↑ | 11.5 | ↑ | ↑ | ↑ | ↑ | ↑ | 6.7 | 4.93 | 361 | 0.88 | 4.50 | 107 | 1.23 |
| 163 | ↑ | 12.8 | ↑ | ↑ | ↑ | ↑ | ↑ | 6.4 | 4.97 | 339 | 0.87 | | 103 | 1.27 |
| 164 | ↑ | 14.1 | ↑ | ↑ | ↑ | ↑ | ↑ | 6.0 | 5.02 | 314 | 0.86 | | | |
| 171 | 2.15 | 8.9 | 65 | 6 | 13 | 16 | 78 | 6.5 | 4.94 | 389 | 0.90 | | 103 | 1.21 |
| 172 | ↑ | 10.2 | ↑ | ↑ | ↑ | ↑ | ↑ | 6.2 | 4.95 | 376 | 0.88 | | 103 | 1.23 |
| 173 | ↑ | 11.5 | ↑ | ↑ | ↑ | ↑ | ↑ | 5.8 | 5.05 | 352 | 0.90 | 4.47 | 106 | 1.23 |
| 174 | ↑ | 12.8 | ↑ | ↑ | ↑ | ↑ | ↑ | 5.5 | 4.97 | 335 | 0.87 | | 103 | 1.22 |
| 175 | ↑ | 14.1 | ↑ | ↑ | ↑ | ↑ | ↑ | 5.2 | 5.05 | 312 | 0.89 | | | |

TABLE 3

| | Heater (kW) | Second magnetic layer | | Third magnetic layer | | | | | | | | | | | |
|---|---|---|---|---|---|---|---|---|---|---|---|---|---|---|---|
| | | Thickness (nm) | Bias (V) | Co | Cr | Pt | B | Co + Pt | Thickness (nm) | Brt (T·nm) | Hcr (kA/m) | S' | Δθ50 (deg) | KV/kT | BrOR |
| Test Example 201 | 1.60 | 8.3 | −200 | 67 | 12 | 13 | 8 | 80 | 6.2 | 4.83 | 373 | 0.87 | | 96.9 | 1.21 |
| Test Example 202 | ↑ | 10.7 | ↑ | ↑ | ↑ | ↑ | ↑ | ↑ | 5.0 | 4.82 | 348 | 0.87 | 4.97 | 94.6 | 1.24 |
| Test Example 203 | ↑ | 13.1 | ↑ | ↑ | ↑ | ↑ | ↑ | ↑ | 3.9 | 4.66 | 321 | 0.83 | | 77.2 | 1.25 |
| Test Example 204 | ↑ | 15.5 | ↑ | ↑ | ↑ | ↑ | ↑ | ↑ | 2.8 | 4.68 | 303 | 0.80 | | 74.5 | 1.24 |
| Comparative Example 205 | 1.60 | 7.4 | −200 | 65 | 12 | 13 | 10 | 78 | 8.7 | 5.53 | 394 | 0.89 | | 102 | 1.24 |
| Test Example 206 | ↑ | 10.0 | ↑ | ↑ | ↑ | ↑ | ↑ | ↑ | 6.9 | 5.26 | 361 | 0.85 | | 96.4 | 1.24 |
| Test Example 207 | ↑ | 12.7 | ↑ | ↑ | ↑ | ↑ | ↑ | ↑ | 5.2 | 5.00 | 327 | 0.82 | 5.03 | 85.6 | 1.25 |
| Test Example 208 | ↑ | 15.4 | ↑ | ↑ | ↑ | ↑ | ↑ | ↑ | 3.4 | 4.71 | 301 | 0.79 | | 73.4 | 1.30 |
| Test Example 209 | ↑ | 18.0 | ↑ | ↑ | ↑ | ↑ | ↑ | ↑ | 1.7 | 4.48 | 279 | 0.77 | | 66.7 | 1.34 |
| Test Example 210 | ↑ | 15.4 | 0 | ↑ | ↑ | ↑ | ↑ | ↑ | 3.4 | 5.08 | 322 | 0.78 | | 79.7 | 1.27 |
| Test Example 211 | ↑ | ↑ | −100 | ↑ | ↑ | ↑ | ↑ | ↑ | ↑ | 5.00 | 322 | 0.78 | | 77.8 | 1.28 |
| Test Example 212 | ↑ | ↑ | −300 | ↑ | ↑ | ↑ | ↑ | ↑ | ↑ | 4.45 | 266 | 0.82 | | 67.4 | 1.24 |
| Test Example 213 | 1.70 | 9.1 | −200 | 63 | 12 | 13 | 12 | 76 | 7.7 | 5.13 | 399 | 0.83 | | 95.7 | 1.27 |
| Test Example 214 | ↑ | 11.5 | ↑ | ↑ | ↑ | ↑ | ↑ | ↑ | 6.3 | 5.05 | 361 | 0.79 | 5.12 | 87.8 | 1.30 |

TABLE 3-continued

|  | | Second magnetic layer | | Third magnetic layer | | | | | | | | | | | |
|---|---|---|---|---|---|---|---|---|---|---|---|---|---|---|---|
|  | Heater (kW) | Thickness (nm) | Bias (V) | Co | Cr | Pt | B | Co + Pt | Thickness (nm) | Brt (T·nm) | Hcr (kA/m) | S' | Δθ50 (deg) | KV/ kT | BrOR |
| Test Example 215 | ↑ | 13.8 | ↑ | ↑ | ↑ | ↑ | ↑ | ↑ | 4.9 | 4.92 | 334 | 0.76 |  | 76.8 | 1.32 |
| Test Example 216 | ↑ | 16.2 | ↑ | ↑ | ↑ | ↑ | ↑ | ↑ | 3.5 | 4.95 | 315 | 0.77 |  | 74.4 | 1.32 |
| Test Example 217 | ↑ | 11.5 | 0 | ↑ | ↑ | ↑ | ↑ | ↑ | 6.3 | 5.38 | 379 | 0.80 |  | 94.2 | 1.29 |
| Test Example 218 | ↑ | ↑ | −100 | ↑ | ↑ | ↑ | ↑ | ↑ | ↑ | 5.31 | 386 | 0.80 |  | 95.2 | 1.30 |
| Test Example 219 | ↑ | ↑ | −300 | ↑ | ↑ | ↑ | ↑ | ↑ | ↑ | 4.96 | 336 | 0.81 |  | 89.7 | 1.27 |
| Comparative Example 220 | 2.05 | 8.3 | −200 | 59 | 12 | 13 | 16 | 72 | 10.1 | 4.87 | 375 | 0.83 |  | 78.7 | 1.25 |
| Test Example 221 | ↑ | 10.7 | ↑ | ↑ | ↑ | ↑ | ↑ | ↑ | 8.3 | 4.97 | 377 | 0.82 | 5.38 | 87.4 | 1.30 |
| Test Example 222 | ↑ | 13.1 | ↑ | ↑ | ↑ | ↑ | ↑ | ↑ | 6.4 | 4.83 | 368 | 0.78 |  | 80.9 | 1.31 |
| Comparative Example 231 | 1.80 | 6.0 | −200 | 61 | 11 | 13 | 15 | 74 | 11.0 | 4.90 | 360 | 0.88 |  | 74.7 | 1.26 |
| Test Example 232 | ↑ | 10.7 | ↑ | ↑ | ↑ | ↑ | ↑ | ↑ | 7.8 | 5.14 | 365 | 0.82 | 4.88 | 83.9 | 1.28 |
| Test Example 233 | ↑ | 13.1 | ↑ | ↑ | ↑ | ↑ | ↑ | ↑ | 6.2 | 5.02 | 350 | 0.78 |  | 79.8 | 1.32 |
| Test Example 234 | ↑ | 15.5 | ↑ | ↑ | ↑ | ↑ | ↑ | ↑ | 4.6 | 4.97 | 336 | 0.77 |  | 74.5 | 1.31 |
| Comparative Example 241 | 1.55 | 6.0 | −200 | 67 | 10 | 13 | 10 | 80 | 7.3 | 5.35 | 368 | 0.91 |  | 104 | 1.25 |
| Test Example 242 | ↑ | 8.3 | ↑ | ↑ | ↑ | ↑ | ↑ | ↑ | 6.1 | 5.13 | 366 | 0.89 |  | 97.9 | 1.22 |
| Test Example 243 | ↑ | 10.7 | ↑ | ↑ | ↑ | ↑ | ↑ | ↑ | 5.0 | 4.97 | 340 | 0.88 | 4.88 | 96.3 | 1.25 |
| Test Example 244 | ↑ | 13.1 | ↑ | ↑ | ↑ | ↑ | ↑ | ↑ | 3.8 | 4.82 | 312 | 0.85 |  | 83.9 | 1.24 |
| Test Example 245 | ↑ | 15.5 | ↑ | ↑ | ↑ | ↑ | ↑ | ↑ | 2.6 | 4.70 | 292 | 0.81 |  | 72.7 | 1.25 |
| Comparative Example 246 | 1.70 | 6.0 | −200 | 65 | 10 | 13 | 12 | 78 | 7.5 | 4.95 | 408 | 0.89 |  | 97.2 | 1.24 |
| Test Example 247 | ↑ | 8.3 | ↑ | ↑ | ↑ | ↑ | ↑ | ↑ | 6.4 | 4.92 | 403 | 0.87 |  | 97.3 | 1.23 |
| Test Example 248 | ↑ | 10.7 | ↑ | ↑ | ↑ | ↑ | ↑ | ↑ | 5.3 | 4.90 | 370 | 0.85 | 4.97 | 91.7 | 1.24 |
| Test Example 249 | ↑ | 13.1 | ↑ | ↑ | ↑ | ↑ | ↑ | ↑ | 4.2 | 4.78 | 342 | 0.81 |  | 84.7 | 1.30 |
| Test Example 250 | ↑ | 15.5 | ↑ | ↑ | ↑ | ↑ | ↑ | ↑ | 3.1 | 4.82 | 322 | 0.78 |  | 77.7 | 1.32 |
| Comparative Example 251 | 1.70 | 5.9 | −200 | 63 | 10 | 13 | 14 | 76 | 8.7 | 4.89 | 389 | 0.91 |  | 87.6 | 1.27 |
| Test Example 252 | ↑ | 8.3 | ↑ | ↑ | ↑ | ↑ | ↑ | ↑ | 7.4 | 4.99 | 392 | 0.87 |  | 91.7 | 1.25 |

TABLE 3-continued

| | | Second magnetic layer | | Third magnetic layer | | | | | | | | | | | |
| --- | --- | --- | --- | --- | --- | --- | --- | --- | --- | --- | --- | --- | --- | --- | --- |
| | Heater (kW) | Thickness (nm) | Bias (V) | Co | Cr | Pt | B | Co + Pt | Thickness (nm) | Brt (T·nm) | Hcr (kA/m) | S' | Δθ50 (deg) | KV/kT | BrOR |
| Test Example 253 | ↑ | 10.7 | ↑ | ↑ | ↑ | ↑ | ↑ | ↑ | 6.1 | 4.92 | 364 | 0.85 | 5.12 | 89.8 | 1.29 |
| Test Example 254 | ↑ | 13.1 | ↑ | ↑ | ↑ | ↑ | ↑ | ↑ | 4.8 | 4.83 | 340 | 0.81 | | 80.4 | 1.28 |
| Test Example 255 | ↑ | 15.4 | ↑ | ↑ | ↑ | ↑ | ↑ | ↑ | 3.5 | 4.81 | 318 | 0.76 | | 75.4 | 1.31 |
| Comparative Example 261 | 1.65 | 6.0 | −200 | 67 | 8 | 13 | 10 | 80 | 6.6 | 4.89 | 367 | 0.91 | | 100 | 1.24 |
| Test Example 262 | ↑ | 8.3 | ↑ | ↑ | ↑ | ↑ | ↑ | ↑ | 5.7 | 4.76 | 379 | 0.89 | | 102 | 1.22 |
| Test Example 263 | ↑ | 10.7 | ↑ | ↑ | ↑ | ↑ | ↑ | ↑ | 4.7 | 4.87 | 363 | 0.89 | 5.93 | 103 | 1.19 |
| Test Example 264 | ↑ | 13.1 | ↑ | ↑ | ↑ | ↑ | ↑ | ↑ | 3.7 | 4.85 | 343 | 0.86 | | 95.0 | 1.22 |
| Test Example 265 | ↑ | 15.5 | ↑ | ↑ | ↑ | ↑ | ↑ | ↑ | 2.7 | 4.64 | 325 | 0.82 | | 89.2 | 1.24 |
| Comparative Example 266 | 1.65 | 6.2 | −200 | 65 | 8 | 13 | 14 | 78 | 7.5 | 5.16 | 370 | 0.90 | | 94.4 | 1.25 |
| Test Example 267 | ↑ | 8.6 | ↑ | ↑ | ↑ | ↑ | ↑ | ↑ | 6.4 | 5.09 | 369 | 0.89 | | 94.3 | 1.23 |
| Test Example 268 | ↑ | 11.0 | ↑ | ↑ | ↑ | ↑ | ↑ | ↑ | 5.2 | 4.98 | 348 | 0.89 | 4.93 | 92.3 | 1.25 |
| Test Example 269 | ↑ | 13.4 | ↑ | ↑ | ↑ | ↑ | ↑ | ↑ | 4.1 | 4.83 | 325 | 0.83 | | 82.4 | 1.28 |
| Test Example 270 | ↑ | 15.7 | ↑ | ↑ | ↑ | ↑ | ↑ | ↑ | 2.9 | 4.63 | 305 | 0.80 | | 73.4 | 1.25 |
| Test Example 271 | 2.00 | 10.7 | −200 | 65 | 6 | 13 | 16 | 78 | 4.9 | 5.13 | 378 | 0.89 | | 96.0 | 1.32 |
| Test Example 272 | ↑ | 13.1 | ↑ | ↑ | ↑ | ↑ | ↑ | ↑ | 4.2 | 5.28 | 363 | 0.86 | | 90.3 | 1.32 |
| Test Example 273 | ↑ | 15.5 | ↑ | ↑ | ↑ | ↑ | ↑ | ↑ | 3.4 | 5.23 | 346 | 0.83 | | 83.1 | 1.29 |

TABLE 4

| | | Second magnetic layer | | Third magnetic layer | | | | | | | | | | | |
| --- | --- | --- | --- | --- | --- | --- | --- | --- | --- | --- | --- | --- | --- | --- | --- |
| | Heater (kW) | Thickness (nm) | Bias (V) | Co | Cr | Pt | B | Co + Pt | Thickness (nm) | Brt (T·nm) | Hcr (kA/m) | S' | Δθ50 (deg) | KV/kT | BrOR |
| Test Example 301 | 1.55 | 6.4 | −200 | 67 | 12 | 13 | 8 | 80 | 6.2 | 4.87 | 376 | 0.90 | | 96.0 | 1.28 |
| Test Example 302 | ↑ | 8.4 | ↑ | ↑ | ↑ | ↑ | ↑ | ↑ | 5.1 | 4.96 | 373 | 0.88 | | 96.1 | 1.28 |
| Test Example 303 | ↑ | 10.3 | ↑ | ↑ | ↑ | ↑ | ↑ | ↑ | 4.0 | 4.93 | 363 | 0.87 | 5.13 | 93.6 | 1.32 |
| Test Example 304 | ↑ | 12.2 | ↑ | ↑ | ↑ | ↑ | ↑ | ↑ | 2.9 | 4.99 | 355 | 0.84 | | 89.3 | 1.25 |
| Test Example 305 | ↑ | 14.2 | ↑ | ↑ | ↑ | ↑ | ↑ | ↑ | 1.8 | 4.96 | 343 | 0.84 | | 85.4 | 1.29 |

TABLE 4-continued

| | | Second magnetic layer | | Third magnetic layer | | | | | | | | | | |
|---|---|---|---|---|---|---|---|---|---|---|---|---|---|---|
| | Heater (kW) | Thickness (nm) | Bias (V) | Co | Cr | Pt | B | Co + Pt | Thickness (nm) | Brt (T·nm) | Hcr (kA/m) | S' | Δθ50 (deg) | KV/kT | BrOR |
| Test Example 306 | 1.70 | 7.2 | −200 | 65 | 12 | 13 | 10 | 78 | 6.9 | 4.94 | 407 | 0.85 | | 94.5 | 1.26 |
| Test Example 307 | ↑ | 10.0 | ↑ | ↑ | ↑ | ↑ | ↑ | ↑ | 5.2 | 5.09 | 391 | 0.83 | 5.15 | 97.2 | 1.30 |
| Test Example 308 | ↑ | 12.7 | ↑ | ↑ | ↑ | ↑ | ↑ | ↑ | 3.4 | 5.06 | 368 | 0.82 | | 88.4 | 1.33 |
| Test Example 309 | ↑ | 15.5 | ↑ | ↑ | ↑ | ↑ | ↑ | ↑ | 1.7 | 5.11 | 350 | 0.82 | | 84.7 | 1.32 |
| Test Example 310 | ↑ | 12.7 | 0 | ↑ | ↑ | ↑ | ↑ | ↑ | 3.4 | 5.40 | 371 | 0.82 | | 95.1 | 1.29 |
| Test Example 311 | ↑ | ↑ | −100 | ↑ | ↑ | ↑ | ↑ | ↑ | ↑ | 5.29 | 381 | 0.82 | | 96.0 | 1.33 |
| Test Example 312 | ↑ | ↑ | −300 | ↑ | ↑ | ↑ | ↑ | ↑ | ↑ | 4.85 | 336 | 0.83 | | 81.5 | 1.30 |
| Comparative Example 313 | 1.60 | 7.0 | −200 | 63 | 12 | 13 | 12 | 76 | 7.5 | 4.83 | 403 | 0.86 | | 91.3 | 1.25 |
| Test Example 314 | ↑ | 9.8 | ↑ | ↑ | ↑ | ↑ | ↑ | ↑ | 5.5 | 4.85 | 384 | 0.84 | 5.33 | 90.5 | 1.28 |
| Test Example 315 | ↑ | 12.5 | ↑ | ↑ | ↑ | ↑ | ↑ | ↑ | 3.5 | 4.77 | 360 | 0.83 | | 88.2 | 1.28 |
| Test Example 316 | ↑ | 15.3 | ↑ | ↑ | ↑ | ↑ | ↑ | ↑ | 1.5 | 4.84 | 338 | 0.83 | | 83.6 | 1.35 |
| Test Example 317 | ↑ | 12.5 | 0 | ↑ | ↑ | ↑ | ↑ | ↑ | 3.5 | 5.20 | 366 | 0.83 | | 93.6 | 1.30 |
| Test Example 318 | ↑ | ↑ | −100 | ↑ | ↑ | ↑ | ↑ | ↑ | ↑ | 5.03 | 373 | 0.82 | | 90.6 | 1.30 |
| Test Example 319 | ↑ | ↑ | −300 | ↑ | ↑ | ↑ | ↑ | ↑ | ↑ | 4.60 | 324 | 0.84 | | 78.4 | 1.27 |
| Test Example 331 | 1.55 | 8.4 | −200 | 61 | 11 | 13 | 15 | 74 | 7.3 | 4.82 | 344 | 0.88 | | 77.9 | 1.26 |
| Test Example 332 | ↑ | 10.3 | ↑ | ↑ | ↑ | ↑ | ↑ | ↑ | 5.7 | 4.82 | 355 | 0.83 | 5.10 | 79.1 | 1.30 |
| Test Example 333 | ↑ | 12.2 | ↑ | ↑ | ↑ | ↑ | ↑ | ↑ | 4.0 | 4.84 | 356 | 0.83 | | 81.2 | 1.31 |
| Test Example 334 | ↑ | 14.2 | ↑ | ↑ | ↑ | ↑ | ↑ | ↑ | 2.4 | 4.89 | 352 | 0.83 | | 81.8 | 1.33 |
| Test Example 341 | 1.60 | 6.4 | −200 | 67 | 10 | 13 | 10 | 80 | 6.2 | 4.98 | 372 | 0.90 | | 95.3 | 1.27 |
| Test Example 342 | ↑ | 8.4 | ↑ | ↑ | ↑ | ↑ | ↑ | ↑ | 5.0 | 4.99 | 373 | 0.87 | | 92.9 | 1.24 |
| Test Example 343 | ↑ | 10.3 | ↑ | ↑ | ↑ | ↑ | ↑ | ↑ | 3.9 | 4.91 | 364 | 0.86 | 5.15 | 91.9 | 1.27 |
| Test Example 344 | ↑ | 12.2 | ↑ | ↑ | ↑ | ↑ | ↑ | ↑ | 2.7 | 4.89 | 354 | 0.85 | | 87.2 | 1.23 |
| Test Example 345 | ↑ | 14.2 | ↑ | ↑ | ↑ | ↑ | ↑ | ↑ | 1.6 | 4.76 | 340 | 0.83 | | 81.9 | 1.28 |
| Test Example 346 | 1.65 | 6.4 | −200 | 65 | 10 | 13 | 12 | 78 | 6.3 | 4.81 | 406 | 0.90 | | 95.9 | 1.23 |
| Test Example 347 | ↑ | 8.4 | ↑ | ↑ | ↑ | ↑ | ↑ | ↑ | 5.2 | 4.88 | 405 | 0.88 | | 99.8 | 1.28 |
| Test Example 348 | ↑ | 10.3 | ↑ | ↑ | ↑ | ↑ | ↑ | ↑ | 4.1 | 4.89 | 401 | 0.85 | 6.01 | 101 | 1.24 |
| Test Example 349 | ↑ | 12.2 | ↑ | ↑ | ↑ | ↑ | ↑ | ↑ | 3.0 | 4.87 | 391 | 0.85 | | 99.7 | 1.26 |
| Test Example 350 | ↑ | 14.2 | ↑ | ↑ | ↑ | ↑ | ↑ | ↑ | 1.9 | 4.99 | 382 | 0.85 | | 101.7 | 1.26 |
| Comparative Example 351 | 1.65 | 7.1 | −200 | 63 | 10 | 13 | 14 | 76 | 7.3 | 4.96 | 393 | 0.90 | | 91.0 | 1.25 |
| Test Example 352 | ↑ | 9.0 | ↑ | ↑ | ↑ | ↑ | ↑ | ↑ | 6.0 | 4.94 | 391 | 0.87 | | 92.8 | 1.28 |
| Test Example 353 | ↑ | 10.9 | ↑ | ↑ | ↑ | ↑ | ↑ | ↑ | 4.7 | 4.94 | 384 | 0.85 | 5.19 | 92.5 | 1.30 |
| Test Example 354 | ↑ | 12.9 | ↑ | ↑ | ↑ | ↑ | ↑ | ↑ | 3.4 | 4.86 | 369 | 0.84 | | 88.1 | 1.26 |
| Test Example 355 | ↑ | 14.8 | ↑ | ↑ | ↑ | ↑ | ↑ | ↑ | 2.1 | 4.94 | 356 | 0.83 | | 85.5 | 1.32 |
| Test Example 361 | 1.70 | 6.4 | −200 | 67 | 8 | 13 | 12 | 80 | 5.7 | 5.02 | 386 | 0.89 | | 99.2 | 1.31 |
| Test Example 362 | ↑ | 8.4 | ↑ | ↑ | ↑ | ↑ | ↑ | ↑ | 4.7 | 4.95 | 386 | 0.89 | | 97.5 | 1.28 |
| Test Example 363 | ↑ | 10.3 | ↑ | ↑ | ↑ | ↑ | ↑ | ↑ | 3.8 | 5.06 | 380 | 0.87 | 5.09 | 90.8 | 1.29 |

TABLE 4-continued

| | | Second magnetic layer | | Third magnetic layer | | | | | | | | | | | |
|---|---|---|---|---|---|---|---|---|---|---|---|---|---|---|---|
| | Heater (kW) | Thickness (nm) | Bias (V) | Co | Cr | Pt | B | Co + Pt | Thickness (nm) | Brt (T·nm) | Hcr (kA/m) | S' | Δθ50 (deg) | KV/kT | BrOR |
| Test Example 364 | ↑ | 12.2 | ↑ | ↑ | ↑ | ↑ | ↑ | ↑ | 2.8 | 5.00 | 369 | 0.85 | | 91.4 | 1.29 |
| Test Example 365 | ↑ | 14.2 | ↑ | ↑ | ↑ | ↑ | ↑ | ↑ | 1.8 | 5.10 | 360 | 0.83 | | 88.0 | 1.29 |
| Comparative Example 366 | 1.70 | 4.0 | −200 | 65 | 8 | 13 | 14 | 78 | 8.3 | 5.49 | 379 | 0.90 | | 98.3 | 1.28 |
| Comparative Example 367 | ↑ | 6.7 | ↑ | ↑ | ↑ | ↑ | ↑ | ↑ | 6.7 | 5.28 | 399 | 0.90 | | 100 | 1.29 |
| Test Example 368 | ↑ | 9.3 | ↑ | ↑ | ↑ | ↑ | ↑ | ↑ | 5.1 | 5.17 | 391 | 0.89 | 5.23 | 99.7 | 1.29 |
| Test Example 369 | ↑ | 12.0 | ↑ | ↑ | ↑ | ↑ | ↑ | ↑ | 3.4 | 5.15 | 379 | 0.86 | | 94.7 | 1.34 |
| Test Example 370 | ↑ | 14.6 | ↑ | ↑ | ↑ | ↑ | ↑ | ↑ | 1.8 | 5.14 | 358 | 0.85 | | 89.7 | 1.29 |
| Test Example 371 | 1.65 | 7.0 | −200 | 63 | 8 | 13 | 16 | 76 | 6.2 | 4.68 | 350 | 0.91 | | 82.2 | 1.30 |
| Test Example 372 | ↑ | 8.9 | ↑ | ↑ | ↑ | ↑ | ↑ | ↑ | 5.3 | 4.94 | 366 | 0.89 | | 87.6 | 1.28 |
| Test Example 373 | ↑ | 10.9 | ↑ | ↑ | ↑ | ↑ | ↑ | ↑ | 4.4 | 5.04 | 369 | 0.87 | 5.26 | 90.6 | 1.32 |
| Test Example 374 | ↑ | 12.8 | ↑ | ↑ | ↑ | ↑ | ↑ | ↑ | 3.5 | 5.09 | 367 | 0.86 | | 85.8 | 1.29 |
| Test Example 375 | ↑ | 14.7 | ↑ | ↑ | ↑ | ↑ | ↑ | ↑ | 2.6 | 5.41 | 365 | 0.84 | | 90.3 | 1.34 |
| Test Example 381 | 1.70 | 6.2 | −200 | 65 | 6 | 13 | 16 | 78 | 5.4 | 4.35 | 331 | 0.91 | | 82.0 | 1.29 |
| Test Example 382 | ↑ | 8.2 | ↑ | ↑ | ↑ | ↑ | ↑ | ↑ | 4.7 | 4.76 | 362 | 0.87 | | 87.3 | 1.29 |
| Test Example 383 | ↑ | 10.3 | ↑ | ↑ | ↑ | ↑ | ↑ | ↑ | 3.9 | 4.98 | 369 | 0.88 | 5.05 | 88.8 | 1.24 |
| Test Example 384 | ↑ | 12.3 | ↑ | ↑ | ↑ | ↑ | ↑ | ↑ | 3.2 | 5.22 | 377 | 0.87 | | 92.6 | 1.26 |
| Test Example 385 | ↑ | 14.4 | ↑ | ↑ | ↑ | ↑ | ↑ | ↑ | 2.4 | 5.61 | 380 | 0.86 | | 94.3 | 1.31 |

TABLE 5

| | Head 51 | Head 52 | Head 53 | Head 54 | Head 55 |
|---|---|---|---|---|---|
| Measured radius (mm) | 20.93 | 18.9 | 18.9 | 20.93 | 20.93 |
| Skew (degree) | 0 | −14.8 | −14.8 | 0 | 0 |
| Maximum linear recording density (kFCI) | 810.2 | 794.2 | 794.2 | 810.2 | 903.1 |
| (MFCmm) | 20.58 | 20.17 | 20.17 | 20.58 | 22.94 |
| Number of rotation (s⁻¹) | 70 | 167 | 167 | 70 | 70 |
| Writing current (mA) | 37 | 30 | 30 | 37 | 37 |
| Erasing current (mA) | 40 | 40 | 40 | 40 | 40 |
| Sense current (mA) | 2.4 | 3.1 | 2.57 | 2.2 | 2.6 |
| Writing track width (nm) | 270 | 320 | 305 | 349 | 263 |
| Reading track width (nm) | 233 | 199 | 206 | 196 | 245 |

TABLE 6

| Test Example | O/Wn'n (dB) | Isolated read pulse output (uVpp) | PW50 (nm) | Output resolution (%) | Medium S/N (dB) | logBER |
|---|---|---|---|---|---|---|
| 103 | −32.5 | 889 | 91.2 | 54.1 | 21.2 | −5.8 |
| 104 | −33.8 | 894 | 91.1 | 55.3 | 21.8 | −5.9 |
| 108 | −34.4 | 860 | 91.3 | 52.6 | 22.4 | −6.3 |
| 109 | −34.8 | 838 | 91.8 | 51.6 | 22.6 | −6.3 |
| 113 | −32.4 | 868 | 92.1 | 52.0 | 22.8 | −6.1 |
| 114 | −32.9 | 841 | 93.2 | 50.9 | 22.7 | −6.2 |
| 116 | −30.5 | 818 | 97.0 | 48.3 | 22.5 | −5.4 |
| 117 | −31.7 | 840 | 96.3 | 49.1 | 22.5 | −5.6 |
| 122 | −31.0 | 831 | 95.3 | 50.1 | 22.8 | −5.8 |
| 123 | −31.3 | 850 | 95.2 | 49.2 | 23.0 | −5.9 |
| 133 | −32.4 | 897 | 91.4 | 54.0 | 21.3 | −5.6 |
| 134 | −34.0 | 879 | 90.2 | 53.6 | 21.8 | −6.1 |
| 138 | −31.7 | 884 | 91.9 | 53.1 | 21.8 | −5.8 |
| 139 | −32.0 | 874 | 90.7 | 53.6 | 22.0 | −6.1 |
| 142 | −30.1 | 893 | 93.3 | 50.3 | 22.4 | −5.8 |
| 143 | −31.7 | 862 | 93.0 | 49.8 | 22.8 | −6.1 |
| 152 | −31.2 | 898 | 90.2 | 55.6 | 20.5 | −5.3 |
| 154 | −33.1 | 876 | 91.0 | 53.4 | 21.7 | −5.8 |
| 157 | −30.7 | 897 | 91.9 | 52.6 | 21.8 | −5.7 |
| 158 | −33.3 | 866 | 92.4 | 52.5 | 22.1 | −6.0 |
| 162 | −30.5 | 867 | 93.7 | 52.0 | 21.9 | −5.6 |
| 163 | −32.2 | 885 | 92.6 | 51.4 | 22.1 | −6.0 |
| 173 | −30.8 | 908 | 92.3 | 53.4 | 20.9 | −5.3 |
| 174 | −32.9 | 906 | 91.9 | 52.6 | 21.2 | −5.7 |
| 202 | −32.1 | 916 | 92.7 | 52.1 | 21.5 | −5.3 |
| 203 | −34.3 | 856 | 91.8 | 51.1 | 22.1 | −5.9 |
| 206 | −34.1 | 910 | 93.2 | 51.8 | 21.7 | −5.7 |
| 207 | −33.4 | 877 | 94.2 | 50.5 | 22.2 | −5.9 |
| 214 | −30.5 | 857 | 93.7 | 50.5 | 22.4 | −5.8 |
| 215 | −32.2 | 838 | 94.5 | 49.9 | 22.6 | −5.9 |
| 221 | −30.9 | 814 | 96.0 | 48.9 | 22.3 | −5.2 |
| 222 | −32.5 | 792 | 96.7 | 48.9 | 22.5 | −5.6 |
| 232 | −31.4 | 857 | 95.2 | 50.4 | 22.9 | −6.0 |

TABLE 6-continued

| Test Example | O/Wn'n (dB) | Isolated read pulse output (uVpp) | PW50 (nm) | Output resolution (%) | Medium S/N (dB) | logBER |
|---|---|---|---|---|---|---|
| 234 | −34.6 | 827 | 94.8 | 50.2 | 23.0 | −6.2 |
| 242 | −31.3 | 936 | 91.7 | 54.3 | 19.4 | −4.4 |
| 243 | −31.2 | 917 | 91.9 | 51.1 | 21.0 | −5.3 |
| 248 | −32.1 | 880 | 92.3 | 53.1 | 21.9 | −6.0 |
| 250 | −36.4 | 863 | 92.2 | 51.2 | 22.7 | −6.5 |
| 253 | −29.7 | 857 | 93.8 | 50.0 | 22.3 | −5.8 |
| 263 | −32.5 | 884 | 91.0 | 54.3 | 20.4 | −4.9 |
| 265 | −35.8 | 839 | 92.7 | 52.0 | 21.1 | −5.1 |
| 268 | −31.5 | 867 | 92.5 | 52.2 | 21.1 | −5.2 |
| 269 | −33.4 | 865 | 93.2 | 50.3 | 22.0 | −5.7 |
| 271 | −30.1 | 923 | 92.1 | 52.1 | 21.2 | −5.5 |
| 273 | −31.1 | 922 | 94.3 | 50.6 | 22.3 | −6.2 |
| 303 | −33.7 | 897 | 91.2 | 54.6 | 20.4 | −5.1 |
| 308 | −30.0 | 859 | 94.4 | 49.7 | 22.3 | −5.9 |
| 309 | −34.9 | 841 | 95.6 | 49.5 | 22.9 | −6.0 |
| 315 | −33.1 | 834 | 93.3 | 49.7 | 22.6 | −5.8 |
| 316 | −33.6 | 849 | 93.8 | 50.5 | 22.6 | −6.0 |
| 332 | −32.7 | 823 | 94.2 | 50.1 | 22.6 | −6.0 |
| 334 | −33.9 | 852 | 93.9 | 50.2 | 22.6 | −6.0 |
| 343 | −31.4 | 902 | 92.5 | 54.6 | 20.8 | −5.4 |
| 345 | −34.1 | 867 | 93.2 | 50.9 | 22.1 | −6.0 |
| 348 | −31.1 | 857 | 92.0 | 52.6 | 20.9 | −5.2 |
| 353 | −29.6 | 860 | 94.1 | 49.9 | 22.0 | −5.6 |
| 355 | −31.6 | 850 | 94.6 | 48.8 | 22.4 | −5.9 |
| 363 | −30.1 | 904 | 92.6 | 52.1 | 20.9 | −5.5 |
| 365 | −32.3 | 903 | 93.2 | 51.3 | 22.1 | −6.1 |
| 369 | −29.2 | 882 | 93.4 | 50.5 | 21.5 | −5.6 |
| 370 | −29.5 | 847 | 96.6 | 48.7 | 22.0 | −5.9 |
| 373 | −30.5 | 900 | 94.2 | 51.6 | 21.7 | −5.7 |
| 375 | −30.7 | 923 | 94.2 | 48.9 | 22.1 | −6.0 |
| 383 | −31.1 | 911 | 93.1 | 51.6 | 21.3 | −5.4 |
| 385 | −29.9 | 967 | 95.5 | 50.2 | 21.9 | −5.8 |

TABLE 7

| | O/Wn'n (dB) | Output resolution (%) | Medium S/N (dB) | logBER |
|---|---|---|---|---|
| Test Example 141 | −27.6 | 57.9 | 19.9 | −4.2 |
| Test Example 142 | −31.5 | 57.2 | 20.7 | −4.5 |
| Test Example 143 | −33.2 | 56.9 | 20.8 | −4.6 |
| Test Example 156 | −27.8 | 58.6 | 19.2 | −3.9 |
| Test Example 157 | −30.6 | 62.2 | 19.4 | −4.2 |
| Test Example 158 | −31.5 | 58.0 | 20.3 | −4.3 |
| Test Example 161 | −28.4 | 59.6 | 19.7 | −4.3 |
| Test Example 162 | −30.2 | 58.9 | 20.1 | −4.4 |
| Test Example 163 | −30.6 | 60.5 | 20.4 | — |
| Test Example 171 | −27.8 | 59.5 | 18.4 | −3.7 |
| Test Example 172 | −28.4 | 60.8 | 18.8 | −3.8 |
| Test Example 173 | −29.1 | 59.8 | 19.2 | −4.0 |
| Test Example 174 | −30.3 | 60.7 | 19.6 | −4.1 |
| Comparative Example 205 | — | 60.1 | 19.0 | −3.9 |
| Test Example 206 | −29.4 | 60.4 | 19.9 | −4.4 |
| Test Example 207 | −31.4 | 59.9 | 20.0 | −4.5 |
| Test Example 210 | −34.1 | 58.5 | 20.5 | −4.4 |
| Test Example 211 | −34.5 | 56.4 | 20.4 | −4.7 |
| Test Example 213 | — | 56.2 | 20.0 | −4.1 |
| Test Example 214 | −30.9 | 55.3 | 20.4 | −4.3 |
| Test Example 215 | −34.6 | 57.2 | 20.7 | −4.5 |
| Test Example 216 | −37.4 | 55.1 | 20.8 | −4.5 |
| Test Example 217 | −29.9 | 56.6 | 20.1 | −4.3 |
| Test Example 218 | −29.4 | 55.8 | 20.2 | −4.3 |
| Test Example 219 | −33.8 | 55.0 | 20.9 | −4.7 |
| Comparative Example 251 | −27.8 | 56.6 | 19.0 | −3.5 |
| Test Example 252 | −29.4 | 55.3 | 19.5 | −3.9 |
| Test Example 253 | −30.9 | 56.1 | 20.2 | −4.1 |
| Test Example 254 | −32.1 | 55.9 | 20.7 | −4.4 |
| Test Example 255 | −34.4 | 56.4 | 20.9 | −4.3 |
| Comparative Example 266 | −26.9 | 58.4 | 17.2 | −3.1 |

TABLE 7-continued

| | O/Wn'n (dB) | Output resolution (%) | Medium S/N (dB) | logBER |
|---|---|---|---|---|
| Test Example 267 | −29.1 | 58.2 | 18.0 | −3.4 |
| Test Example 268 | −29.9 | 58.2 | 19.2 | −3.9 |
| Test Example 269 | −32.3 | 57.6 | 20.0 | −4.1 |
| Test Example 270 | −36.4 | 56.7 | 20.4 | −4.2 |
| Test Example 271 | −28.5 | 59.2 | 19.1 | −4.0 |
| Test Example 272 | −27.6 | 59.3 | 19.7 | −4.2 |
| Test Example 273 | −28.8 | 57.1 | 20.1 | −4.4 |
| Test Example 306 | — | 57.7 | 19.6 | −4.2 |
| Test Example 307 | −29.6 | 56.5 | 19.6 | −4.3 |
| Test Example 308 | −31.4 | 57.5 | 20.2 | −4.3 |
| Test Example 309 | −31.7 | 55.5 | 20.1 | −4.4 |
| Test Example 310 | −30.7 | 58.3 | 19.8 | −4.2 |
| Test Example 311 | −30.5 | 56.0 | 19.9 | −4.4 |
| Test Example 312 | −33.9 | 56.9 | 20.2 | −4.1 |
| Comparative Example 313 | −26.3 | 58.9 | 20.0 | −4.2 |
| Test Example 314 | −29.7 | 55.8 | 20.3 | −4.4 |
| Test Example 315 | −29.5 | 58.0 | 20.6 | −4.5 |
| Test Example 316 | −31.2 | 56.1 | 20.4 | −4.5 |
| Test Example 317 | — | 56.3 | 20.3 | −4.5 |
| Test Example 318 | −28.0 | 57.7 | 20.6 | −4.6 |
| Test Example 319 | −36.5 | 57.0 | 20.3 | −4.5 |
| Comparative Example 351 | −28.0 | 55.7 | 19.2 | −3.7 |
| Test Example 352 | −28.8 | 57.9 | 19.7 | −4.0 |
| Test Example 353 | −30.1 | 58.4 | 19.8 | −4.1 |
| Test Example 354 | −30.5 | 56.9 | 20.5 | −4.1 |
| Test Example 355 | −30.8 | 56.4 | 20.4 | −4.2 |
| Comparative Example 366 | −25.8 | 54.5 | 16.6 | −2.7 |
| Comparative Example 367 | −25.9 | 56.0 | 18.1 | −3.4 |
| Test Example 368 | −26.6 | 57.6 | 18.8 | −3.8 |
| Test Example 369 | −28.0 | 57.2 | 19.5 | −4.2 |
| Test Example 370 | −30.3 | 54.7 | 20.2 | −4.2 |
| Test Example 372 | −27.2 | 59.4 | 19.2 | −4.1 |
| Test Example 373 | −29.3 | 58.5 | 19.7 | −4.2 |
| Test Example 374 | −29.6 | 57.9 | 20.2 | −4.5 |
| Test Example 375 | −30.6 | 57.1 | 20.1 | −4.3 |

TABLE 8

| | O/Wn'n (dB) | Output resolution (%) | Medium S/N (dB) | logBER |
|---|---|---|---|---|
| Test Example 102 | −25.4 | 58.8 | 19.1 | −3.8 |
| Test Example 103 | −28.9 | 58.9 | 19.4 | −4.1 |
| Test Example 104 | −29.3 | 60.3 | 19.5 | −4.2 |
| Test Example 132 | −26.8 | 59.9 | 19.2 | −4.0 |
| Test Example 133 | −26.5 | 59.5 | 19.5 | −4.0 |
| Test Example 134 | −29.2 | 59.7 | 19.7 | −4.3 |
| Test Example 137 | −27.1 | 60.9 | 19.3 | −4.1 |
| Test Example 138 | −27.7 | 60.1 | 19.9 | −4.3 |
| Test Example 139 | −30.4 | 60.7 | 19.9 | −4.3 |
| Test Example 152 | −28.0 | 61.9 | 18.6 | −3.9 |
| Test Example 153 | −25.7 | 59.8 | 19.5 | −4.1 |
| Comparative Example 241 | −23.9 | 58.2 | 16.3 | −2.8 |
| Test Example 242 | −24.4 | 57.5 | 17.8 | −3.2 |
| Test Example 243 | −27.8 | 58.7 | 18.6 | −3.7 |
| Test Example 247 | −27.0 | 59.2 | 19.3 | −3.7 |
| Test Example 248 | −30.1 | 58.4 | 19.7 | −4.1 |
| Test Example 249 | −29.8 | 59.7 | 20.2 | — |
| Test Example 250 | −32.0 | 59.0 | 20.3 | −4.5 |
| Comparative Example 261 | −27.9 | 60.4 | 16.8 | −2.8 |

TABLE 8-continued

| | O/Wn'n (dB) | Output resolution (%) | Medium S/N (dB) | logBER |
|---|---|---|---|---|
| Test Example 262 | −30.1 | 61.0 | 17.6 | −3.2 |
| Test Example 263 | −27.2 | 61.4 | 18.4 | −3.6 |
| Test Example 264 | −29.9 | 58.6 | 18.9 | — |
| Test Example 265 | −32.2 | 57.1 | 19.5 | −3.6 |
| Test Example 301 | −22.4 | 57.2 | 17.7 | −3.3 |
| Test Example 302 | −25.2 | 58.0 | 18.4 | −3.4 |
| Test Example 303 | −26.8 | 57.2 | 19.2 | −3.9 |
| Test Example 304 | −26.5 | 56.8 | 19.6 | −4.0 |
| Test Example 341 | −23.6 | 58.1 | 17.8 | −3.2 |
| Test Example 342 | −23.1 | 57.8 | 18.8 | −3.5 |
| Test Example 343 | −25.9 | 58.8 | 19.2 | −4.0 |
| Test Example 344 | −24.9 | 57.8 | 19.5 | −4.0 |
| Test Example 345 | −27.7 | 57.0 | 20.0 | −4.1 |
| Test Example 348 | −30.6 | 59.2 | 19.2 | −3.7 |
| Test Example 349 | −32.4 | 58.7 | 19.3 | −3.8 |
| Test Example 350 | −29.8 | 57.0 | 19.5 | −3.6 |
| Test Example 361 | −26.6 | 60.9 | 17.4 | −3.3 |
| Test Example 362 | −26.7 | 60.9 | 18.6 | −3.6 |
| Test Example 363 | −28.6 | 59.5 | 19.1 | −3.7 |
| Test Example 364 | −27.1 | 59.5 | 19.6 | −4.2 |
| Test Example 365 | −29.1 | 59.7 | 19.9 | −4.3 |
| Test Example 382 | −25.9 | 59.4 | 18.4 | −3.6 |
| Test Example 383 | −25.6 | 57.9 | 19.0 | −3.9 |
| Test Example 384 | −24.8 | 57.8 | 19.7 | −4.0 |
| Test Example 385 | −23.8 | 56.1 | 19.8 | −4.0 |

TABLE 9

| Test Example | Heater (kW) | Second magnetic layer Thickness (nm) | Third magnetic layer Co | Cr | Pt | B | Ta | Co + Pt | Thickness (nm) | Brt (T·nm) | Hcr (kA/m) | S' | KV/kT | BrOR |
|---|---|---|---|---|---|---|---|---|---|---|---|---|---|---|
| 401 | 1.55 | 9.8 | 63 | 16 | 13 | 8 | 0 | 76 | 4.9 | 5.02 | 391 | 0.88 | 100.9 | 1.34 |
| 402 | ↑ | 12.7 | 63 | 16 | 13 | 8 | 0 | 76 | 3.2 | 5.10 | 352 | 0.88 | 91.3 | 1.36 |
| 406 | 1.65 | 9.8 | 63 | 12 | 13 | 12 | 0 | 76 | 4.5 | 5.21 | 396 | 0.87 | 97.5 | 1.32 |
| 407 | ↑ | 12.7 | 63 | 12 | 13 | 12 | 0 | 76 | 2.9 | 5.02 | 362 | 0.87 | 90.5 | 1.34 |
| 411 | 1.50 | 9.8 | 65 | 12 | 13 | 10 | 0 | 78 | 4.0 | 4.99 | 365 | 0.89 | 91.9 | 1.33 |
| 412 | ↑ | 12.7 | 65 | 12 | 13 | 10 | 0 | 78 | 2.6 | 4.98 | 349 | 0.87 | 88.8 | 1.33 |
| 416 | 1.55 | 9.8 | 67 | 12 | 13 | 8 | 0 | 80 | 3.9 | 5.24 | 380 | 0.90 | 105.0 | 1.28 |
| 417 | ↑ | 12.7 | 67 | 12 | 13 | 8 | 0 | 80 | 2.5 | 5.05 | 346 | 0.89 | 88.8 | 1.36 |
| 421 | 1.55 | 9.8 | 63 | 10 | 13 | 14 | 0 | 76 | 4.4 | 5.04 | 375 | 0.88 | 89.9 | 1.33 |
| 422 | ↑ | 12.7 | 63 | 10 | 13 | 14 | 0 | 76 | 2.9 | 4.99 | 358 | 0.87 | — | 1.31 |
| 426 | 1.55 | 9.8 | 65 | 10 | 13 | 12 | 0 | 78 | 3.8 | 5.03 | 377 | 0.89 | 93.8 | 1.28 |
| 427 | ↑ | 12.7 | 65 | 10 | 13 | 12 | 0 | 78 | 2.5 | 4.97 | 356 | 0.88 | 89.6 | 1.33 |
| 431 | 1.50 | 9.8 | 67 | 10 | 13 | 10 | 0 | 80 | 3.5 | 5.09 | 354 | 0.90 | 92.3 | 1.32 |
| 432 | ↑ | 12.7 | 67 | 10 | 13 | 10 | 0 | 80 | 2.3 | 4.91 | 340 | 0.89 | 87.4 | 1.33 |
| 436 | 1.55 | 9.8 | 67 | 8 | 13 | 12 | 0 | 80 | 3.4 | 5.16 | 364 | 0.90 | 94.2 | 1.33 |
| 437 | ↑ | 12.7 | 67 | 8 | 13 | 12 | 0 | 80 | 2.3 | 4.89 | 346 | 0.89 | 87.2 | 1.34 |
| 441 | 1.80 | 9.8 | 64 | 12 | 14 | 8 | 2 | 78 | 4.7 | 5.17 | 389 | 0.86 | 99.9 | 1.27 |
| 442 | ↑ | 12.7 | 64 | 12 | 14 | 8 | 2 | 78 | 3.1 | 5.01 | 370 | 0.86 | 94.4 | 1.31 |
| 446 | 1.80 | 9.8 | 66 | 10 | 14 | 8 | 2 | 80 | 4.1 | 5.27 | 376 | 0.88 | 102.3 | 1.31 |
| 447 | ↑ | 12.7 | 66 | 10 | 14 | 8 | 2 | 80 | 2.7 | 5.00 | 362 | 0.86 | 93.8 | 1.37 |
| 451 | 1.80 | 9.8 | 64 | 10 | 14 | 10 | 2 | 78 | 4.4 | 5.18 | 395 | 0.88 | 100.6 | 1.32 |
| 452 | ↑ | 12.7 | 64 | 10 | 14 | 10 | 2 | 78 | 2.9 | 5.09 | 375 | 0.85 | 96.9 | 1.36 |
| 456 | 1.80 | 9.8 | 66 | 8 | 14 | 10 | 2 | 80 | 3.9 | 5.24 | 380 | 0.89 | 102.1 | 1.30 |
| 457 | ↑ | 12.7 | 66 | 8 | 14 | 10 | 2 | 80 | 2.6 | 5.01 | 367 | 0.86 | 92.7 | 1.35 |
| 461 | 1.65 | 9.8 | 64 | 8 | 14 | 12 | 2 | 78 | 4.4 | 5.08 | 371 | 0.89 | 91.0 | 1.31 |
| 462 | ↑ | 12.7 | 64 | 8 | 14 | 12 | 2 | 78 | 2.9 | 5.10 | 366 | 0.87 | 89.5 | 1.33 |

TABLE 10

| Test Example | O/Wn'n (dB) | Isolated read pulse output (uVpp) | PW50 (nm) | Output resolution (%) | Medium S/N (dB) | logBER |
|---|---|---|---|---|---|---|
| 402 | −33.6 | 1062 | 96.4 | 51.5 | 22.0 | −5.75 |
| 407 | −32.1 | 1130 | 96.4 | 50.2 | 22.3 | −5.93 |
| 412 | −32.9 | 1093 | 96.7 | 50.4 | 22.1 | −5.75 |
| 417 | −33.2 | 1094 | 96.3 | 50.7 | 21.3 | −5.57 |
| 422 | −32.2 | 1142 | 96.9 | 50.2 | 22.2 | −6.12 |
| 427 | −33.2 | 1140 | 95.0 | 53.1 | 21.7 | −5.74 |
| 432 | −33.3 | 1158 | 95.1 | 52.9 | 21.5 | −5.59 |
| 437 | −33.1 | 1191 | 97.9 | 49.9 | 21.6 | −5.81 |
| 441 | −29.9 | 1097 | 96.9 | 49.1 | 21.5 | −5.66 |
| 442 | −32.1 | 1074 | 97.0 | 49.4 | 22.0 | −6.01 |
| 447 | −32.8 | 1061 | 96.7 | 51.4 | 21.5 | −5.82 |
| 452 | −31.6 | 1100 | 95.9 | 50.9 | 22.1 | −6.09 |
| 457 | −32.2 | 1105 | 95.3 | 49.9 | 21.9 | −5.92 |
| 462 | −32.4 | 1110 | 96.4 | 51.1 | 22.0 | −5.82 |

TABLE 11

| Test Example | Thickness of second magnetic layer (nm) | Thickness of third magnetic layer (nm) | Brt (T · nm) | Hc (kA/m) | S' | Δθ50 (deg) |
|---|---|---|---|---|---|---|
| 501 | 10.2 | 9.9 | 5.32 | 377 | 0.89 | |
| 502 | 11.3 | 9.5 | 5.14 | 349 | 0.90 | 3.92 |
| 503 | 12.4 | 9.1 | 5.13 | 324 | 0.90 | |
| 504 | 13.6 | 8.7 | 4.95 | 296 | 0.90 | |
| 505 | 11.3 | 9.5 | 5.24 | 346 | 0.88 | |

| Test Example | KV/kT | BrOR | O/Wn'n (dB) | Isolated read pulse output (uVpp) | PW50 (nm) | Output resolution (%) | Medium S/N (dB) | logBER |
|---|---|---|---|---|---|---|---|---|
| 501 | 104 | 1.24 | 30.1 | 854 | 91.6 | 44.3 | 20.6 | −4.28 |
| 502 | 101 | 1.22 | 31.6 | 841 | 90.7 | 44.4 | 21.0 | −4.42 |
| 503 | 101.2 | 1.22 | 32.9 | 829 | 90.9 | 44.9 | 21.2 | −4.46 |
| 504 | 97.0 | 1.22 | 33.7 | 815 | 90.1 | 44.1 | 21.3 | −4.48 |
| 505 | 102 | 1.24 | 31.4 | 849 | 91.4 | 44.4 | 21.3 | −4.33 |

What is claimed is:

1. A magnetic recording medium in which at least a first magnetic layer, a spacer layer comprising Ru as a main ingredient, a second magnetic layer, and a third magnetic layer are formed in contact with each other in order on a substrate, wherein a thickness of the second magnetic layer is larger than a thickness of the third magnetic layer and the total for the concentrations of cobalt and platinum contained in the second magnetic layer is not higher than the total for the concentrations of cobalt and platinum contained in the third magnetic layer;

wherein platinum is contained in the first magnetic layer, the second magnetic layer, and the third magnetic layer; and wherein the concentration of platinum contained in the second magnetic layer is higher than the concentration of platinum contained in the first magnetic layer, and the concentration of platinum contained in the third magnetic layer is higher than the concentration of platinum contained in the second magnetic layer.

2. A magnetic recording medium according to claim 1, wherein the total for the concentrations of cobalt and platinum contained in the second magnetic layer is from about 68 at. % to 76 at. %.

3. A magnetic recording medium according to claim 1, wherein the first magnetic layer comprises an alloy containing Co—Cr, the second magnetic layer comprises an alloy containing Co—Cr—Pt—B, and the third magnetic layer comprises an alloy containing Co—Pt.

4. A magnetic recording medium according to claim 3, wherein a first underlayer comprising one of a Co—Ti—Ni alloy other Co—Ti alloys and a Ni—Ta alloy, a second underlayer comprising a W—Co alloy or Ta, and a third underlayer comprising a Cr—Ti—B alloy or other Cr—Ti alloy are present between the substrate and the first magnetic layer.

5. A magnetic recording medium according to claim 1, further comprising a fourth magnetic layer formed in contact with the third magnetic layer.

6. A magnetic recording medium according to claim 5, wherein the total for the concentration of the ferromagnetic metal elements and the concentration of platinum containing in the second magnetic layer is not more than the total for the concentration of the ferromagnetic metal elements and the concentration of platinum containing in the third magnetic layer.

7. A magnetic recording medium according to claim 5, wherein the total for the concentration of the ferromagnetic metal elements and the concentration of platinum contained in the third magnetic layer is not more than the total for the concentration of the ferromagnetic metal elements and the concentration of platinum contained in the fourth magnetic layer.

8. A magnetic recording medium according to claim 5, wherein the thickness of the third magnetic layer is larger than the thickness of the fourth magnetic layer.

9. A magnetic memory device comprising:
a magnetic recording medium in which at least a first magnetic layer, a spacer layer comprising Ru as a main ingredient, a second magnetic layer, and a third magnetic layer are formed in contact with each other in order on a substrate, wherein a thickness of the second magnetic layer is larger than a thickness of the third magnetic layer and the total for the concentrations of cobalt and platinum contained in the second magnetic layer is not higher than the total for the concentrations of cobalt and platinum contained in the third magnetic layer;
a composite type head having a writing head and a magnetoresistive reading head for writing and reading data to and from the magnetic recording medium; and
a positioning mechanism confirmed to position the composite type head to a radial direction of the magnetic recording medium;

wherein platinum is contained in the first magnetic layer, the second magnetic layer, and the third magnetic layer of the magnetic recording medium; and wherein the concentration of platinum contained in the second magnetic layer is higher than the concentration of platinum contained in the first magnetic layer, and the concentration of platinum contained in the third magnetic layer is higher than the concentration of platinum contained in the second magnetic layer in the magnetic recording medium.

10. A magnetic memory device according to claim 9, wherein the total for the concentrations of cobalt and platinum contained in the second magnetic layer of the magnetic recording medium is from about 68 at. % to 76 at. %.

11. A magnetic recording medium according to claim 9, wherein the first magnetic layer comprises an alloy containing Co—Cr, the second magnetic layer comprises an alloy containing Co—Cr—Pt—B, and the third magnetic layer comprises an alloy containing Co—Pt.

12. A magnetic recording medium according to claim 11, wherein a first underlayer comprising one of a Co—Ti—Ni alloy other Co—Ti alloys and a Ni—Ta alloy, a second underlayer comprising a W—Co alloy or Ta, and a third underlayer comprising a Cr—Ti—B alloy or other Cr—Ti alloys are present between the substrate and the first magnetic layer.

13. A magnetic recording medium according to claim 9, farther comprising a fourth magnetic layer formed in contact with the third magnetic layer.

14. A magnetic recording medium according to claim 13, wherein the total for the concentration of the ferromagnetic metal elements and the concentration of platinum containing in the second magnetic layer is not more than the total for the concentration of the ferromagnetic metal elements and the concentration of platinum containing in the third magnetic layer.

15. A magnetic recording medium according to claim 13, wherein the total for the concentration of the ferromagnetic metal elements and the concentration of platinum contained in the third magnetic layer is not more than the total for the concentration of the ferromagnetic metal elements and the concentration of platinum contained in the fourth magnetic layer.

16. A magnetic recording medium according to claim 13, wherein the thickness of the third magnetic layer is larger than the thickness of the fourth magnetic layer.

* * * * *

UNITED STATES PATENT AND TRADEMARK OFFICE
CERTIFICATE OF CORRECTION

PATENT NO. : 7,532,436 B2  Page 1 of 1
APPLICATION NO. : 11/223603
DATED : May 12, 2009
INVENTOR(S) : Hinoue et al.

It is certified that error appears in the above-identified patent and that said Letters Patent is hereby corrected as shown below:

In the Claims

Claim 4, column 30, line 8, please delete "other Cr-Ti alloy" and insert -- other Cr-Ti alloys --

Claim 13, column 32, line 4, please delete "farther" and insert -- further --

Signed and Sealed this

Fourteenth Day of July, 2009

JOHN DOLL
*Acting Director of the United States Patent and Trademark Office*